(12) United States Patent
Thomas et al.

(10) Patent No.: US 10,764,602 B2
(45) Date of Patent: Sep. 1, 2020

(54) SPATIAL SCALABLE VIDEO CODING

(71) Applicants: Koninklijke KPN N.V., Rotterdam (NL); Nederlandse Organisatie voor Toegepast-Natuurwetenschappelijk Onderzoek TNO, The Hague (NL)

(72) Inventors: Emmanuel Thomas, Delft (NL); Omar Aziz Niamut, Vlaardingen (NL); Robert Koenen, Rotterdam (NL)

(73) Assignees: Koninklijke KPN N.V., Rotterdam (NL); Nedeerlandse Oranisatie voor Toegepast—Natuurwetenschappelijk Onderzoek TNO, The Hague (NL)

( * ) Notice: Subject to any disclaimer, the term of this patent is extended or adjusted under 35 U.S.C. 154(b) by 173 days.

(21) Appl. No.: 16/071,012

(22) PCT Filed: Jan. 24, 2017

(86) PCT No.: PCT/EP2017/051438
§ 371 (c)(1),
(2) Date: Jul. 18, 2018

(87) PCT Pub. No.: WO2017/129568
PCT Pub. Date: Aug. 3, 2017

(65) Prior Publication Data
US 2020/0169751 A1    May 28, 2020

(30) Foreign Application Priority Data
Jan. 25, 2016 (EP) .................................... 16152562

(51) Int. Cl.
H04N 19/59 (2014.01)
H04N 19/184 (2014.01)
(Continued)

(52) U.S. Cl.
CPC ........... *H04N 19/59* (2014.11); *H04N 19/184* (2014.11); *H04N 19/33* (2014.11); *H04N 19/436* (2014.11)

(58) Field of Classification Search
CPC ...... H04N 19/59; H04N 19/184; H04N 19/33; H04N 19/436
See application file for complete search history.

(56) References Cited

U.S. PATENT DOCUMENTS

2012/0294369 A1   11/2012   Bhagavathy et al.
2015/0103886 A1    4/2015   He et al.

OTHER PUBLICATIONS

Xin Li et al. "Multiple Description Image Coding for Scalable and Robust Transmission over IP," Proceedings of the 6th World Congress on Intelligent Control and Automation, Jun. 21-23, 2006, Dalian, China, USA, IEEE, Oct. 23, 2006, pp. 9996-10000 (Year: 2006).*

(Continued)

*Primary Examiner* — Sath V Perungavoor
*Assistant Examiner* — Tyler B Edwards
(74) *Attorney, Agent, or Firm* — McDonnell Boehnen Hulbert & Berghoff LLP

(57) ABSTRACT

A method of forming a video signal by a decoder device is described wherein the method comprises receiving a bitstream and decoder information, the decoder information signaling the decoder device the presence of one or more resolution components in the bitstream for forming a video signal, a resolution component representing a spatially subsampled version, preferably a polyphase subsampled version, of a first video signal having a first resolution, the one or more resolution components being part of a resolution component group, the group comprising a plurality of resolution components on the basis of which the first video signal is reconstructable; and, the decoder device parsing the (Continued)

bitstream and decoding the one or more resolution components into video frames on the basis of the decoder information.

23 Claims, 16 Drawing Sheets

(51) Int. Cl.
*H04N 19/436* (2014.01)
*H04N 19/33* (2014.01)

(56) References Cited

OTHER PUBLICATIONS

Vitali et al. "Low-complexity standard-compatible robust and scalable video streaming over lossy/variable bandwidth networks," 2005 Digest of Technical Papers, International Conference on Consumer Electronics (IEEE Cat. No. 05CH37619) IEEE Piscataway, NJ, USA, Jan. 8, 2005, pp. 7-8, XP010796504 (Year: 2005).*
European Search Report, European Patent Application No. 16152562.1, dated Mar. 21, 2016, 4 pages.
Vitali, Andrea, et al. "Low-Complexity Standard-Compatible Robust and Scalable Video Streaming Over Lossy/Variable Bandwidth Networks." 2005 Digest of Technical Papers. International Conference on IEEE, Jan. 8, 2005, pp. 7-8.
Minoo, Koohyar et al., "Spatial Scalability for HEVC", Joint Collaborative Team on Video Coding (JCT-VC) of ITU-T SG 6 WP3 and ISO/IEC JTC1/SC29/WG11, 5th Meeting, Genneva, Switzerland, Mar. 16-23, 2011, pp. 1-14.
Van Deventer, Oskar M. et al., "Proposed White Paper on MPEG Dash part 1 AMD 2", International Organisation for Standardisation, ISO/IEC JTC1/SC29/WG11, MPEG 2015, Geneva Switzerland, Oct. 19, 2015, 3 pages.
PCT International Search Report and Written Opinion, PCT International Application No. PCT/EP2017/051438, dated Apr. 7, 2017, 13 pages.
Park, Sung Cheol et al., "Super-Resolution Image Reconstruction: A Technical Overview", IEEE Signal Processing Magazine, May 2003, pp. 21-36.
Xin Li et al., Multiple Description ImageCoding for Scalable and Robust Transmission over IP, Proceedings of the 6thWorld Congress on Intelligent Control and Automation, Jun. 21-23, 2006, Dalian, China, U.S.A., IEEE, Oct. 23, 2006, pp. 9996-10000.
Japanese Office Action in Japanese Patent Application No. 2018-538752, dated Oct. 7, 2019.
Sung Cheol Park, Min Kyu Park, and Moon Gi Kang, "Super-Resolution Image Reconstruction: A Technical Overview," IEEE Signal Processing Magazine, May 2003.
Marco Folli, Lorenzo Favalli, and Matteo Lanati, "Parameters optimization for a scalable multiple description coding scheme based on spatial subsampling," Mobimedia 2008, Oulu, Finland.
Heiko Schwarz, Detlev Marpe, and Thomas Wiegand, "MCTF and Scalability Extension of H.264/AVC," Proc. Picture Coding Symposium, Jan. 2004.
Text of ISO/IEC FDIS 23008-2:201X (2nd edition update), Draft ISO/IEC 23008-2:201x(E), ISO/IEC JTC1/SC29/WG11 N14700, Jul. 2014, Sapporo, Japan.
European Office Action in Application No. 17 700 870.3-1208, dated Apr. 2, 2020.

* cited by examiner

| | Descriptor |
|---|---|
| frame_packing_arrangement( payloadSize ) { | |
|   frame_packing_arrangement_id | ue(v) |
|   frame_packing_arrangement_cancel_flag | u(1) |
|   if( !frame_packing_arrangement_cancel_flag ) { | |
|     frame_packing_arrangement_type | u(7) |
|     quincunx_sampling_flag | u(1) |
|     content_interpretation_type | u(6) |
|     spatial_flipping_flag | u(1) |
|     frame0_flipped_flag | u(1) |
|     field_views_flag | u(1) |
|     current_frame_is_frame0_flag | u(1) |
|     if(frame_packing_arrangement_type == 6) { | |
|       current_frame_is_frame1_flag | u(1) |
|       current_frame_is_frame2_flag | u(1) |
|     } | |
|     frame0_self_contained_flag | u(1) |
|     frame1_self_contained_flag | u(1) |
|     if( !quincunx_sampling_flag && frame_packing_arrangement_type != 5 && frame_packing_arrangement_type != 6) { | |
|       frame0_grid_position_x | u(4) |
|       frame0_grid_position_y | u(4) |
|       frame1_grid_position_x | u(4) |
|       frame1_grid_position_y | u(4) |
|     } | |
|     frame_packing_arrangement_reserved_byte | u(8) |
|     frame_packing_arrangement_persistence_flag | u(1) |
|   } | |
|   upsampled_aspect_ratio_flag | u(1) |
| } | |

FIG. 8

| | Descriptor |
|---|---|
| frame_packing_arrangement( payloadSize ) { | |
|   frame_packing_arrangement_id | ue(v) |
|   frame_packing_arrangement_cancel_flag | u(1) |
|   if( !frame_packing_arrangement_cancel_flag ) { | |
|     frame_packing_arrangement_type | u(7) |
|     quincunx_sampling_flag | u(1) |
|     content_interpretation_type | u(6) |
|     spatial_flipping_flag | u(1) |
|     frame0_flipped_flag | u(1) |
|     field_views_flag | u(1) |
|     current_frame_is_frame0_flag | u(1) |
|     frame0_self_contained_flag | u(1) |
|     frame1_self_contained_flag | u(1) |
|     if( !quincunx_sampling_flag && frame_packing_arrangement_type != 5 && frame_packing_arrangement_type != 6 ) { | |
|       frame0_grid_position_x | u(4) |
|       frame0_grid_position_y | u(4) |
|       frame1_grid_position_x | u(4) |
|       frame1_grid_position_y | u(4) |
|     } | |
|     frame_packing_arrangement_reserved_byte | u(8) |
|     frame_packing_arrangement_persistence_flag | u(1) |
|   } | |
|   upsampled_aspect_ratio_flag | u(1) |
| } | |

FIG. 11

SPATIAL SCALABLE VIDEO CODING

CROSS REFERENCE TO RELATED APPLICATIONS

The present application is a national stage entry of, and claims priority to, PCT/EP2017/051438, filed on Jan. 24, 2017, which claims priority to European Patent Application EP 16152562.1, filed in the European Patent Office on Jan. 25, 2016, both of which are hereby incorporated in their entirety herein by reference.

FIELD OF THE INVENTION

The invention relates to spatial scalable video coding, and, in particular, though not exclusively, to methods and systems for spatial scalable video coding, a decoder device adapted for decoding encoded video that is spatially scalable and an encoder device for encoding video into spatial scalable video data and a computer program product for executing such methods.

BACKGROUND OF THE INVENTION

Currently a video coding standard known as the high-efficiently video coding (HEVC or ITU-T H.265) has been developed which may provide a substantially higher compression efficiency when compared to other coding standards such as H.264/AVC (MPEG-4 part 10 Advance Video Coding). Additionally, the scalable extensions of HEVC (SHVC) provides a layered HEVC-based video coding scheme that is comparable to the scalable video coding standard SVC that is based on a base layer and enhancement layers. In such scheme a decoder decodes the base layer, generates the output frame, upscales this frame to the resolution of the enhancement layer so that it can be used for further decoding of an enhancement layer. The thus upscaled frame of the base layer is used as a reference frame in the decoding of an enhancement layer frame in a second loop, resulting in the reconstruction of the high resolution frame. Due to the decoding dependency of the enhancement layer, a delay is introduced in the decoding scheme that scales with the amount of enhancement layers.

US2015/0103886 describes an example of a video coding system that is based on SHVC. This design has the same disadvantage in the sense that due to the decoding dependencies between the base layer and enhancement layers multiple decoding loops (2 or more when there are more than one enhancement layers) have to be sequentially processed. As a result, even if a parallelisation is implemented by decoding the base layer and the enhancement layers in two different processes, both processes operate with a delay of at least one frame, or even multiple frames depending of the coding hierarchy. This results in delays when a user wants to switch to a higher resolution, or when tuning in a broadcast stream where decoder needs to first decode the base layer and then the enhancement layers.

Additionally, in SHVC different resolution versions of the original high resolution video signal are generated on the basis of a sequence of downsampling steps for downsampling the high resolution video signal to different low resolution versions. Similarly, when reconstructing the original high resolution video signal, a number of sequential upsampling steps are required that scales with the number of enhancement layers that needs to be added to the base layer. After each upsampling step the buffer occupancy is increased. Hence, for each layer a different buffer sizes need to be defined and dependencies between layers required up or down sampling of the resolution.

More generally, a multi-loop video coding design such as SHVC introduces a high implementation complexity and high memory consumption since the decoder needs to store the decoded frames in memory (as long as they are needed for decoding dependant frames from enhancement layers). The complexity makes codec designs such as SHVC make less attractive for fast development of a hardware implementation that is required for industry acceptance.

Hence, from the above it follows that there is a need in the art for improved spatial scalable coding schemes that reduces complexity and/or delays in both encoding and decoding side. In particular, there is a need in the art for improved spatial scalable coding schemes that allow a high-level of parallelization of the decoder operations.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments in this disclosure relate to the formation of high-resolution (HR) video frames of an HR video signal using video frames of multiple low-resolution (LR) video streams of the same or substantially the same scene. In this disclosure, a (low) resolution description of a video signal refers to a (low) resolution version of a high-resolution source video signal. A resolution component refers to a resolution description that has been generated in such a way that it can be recombined with other resolution components to form the original source video signal.

Further, in this disclosure, the terms "high resolution" and "low resolution" are used in order to distinguish a spatial resolution difference between different video signals. For example, a high resolution video signal may have 4K or 8K UHD video format and its low resolution descriptions may have a HD video format or any other video format that has a lower spatial resolution that the video format of the high resolution video signal. Similarly, the high resolution video signal may have an HD video format and its low resolution descriptions have an SD video format or any other video format that has a lower spatial resolution than the video format of the high resolution video signal.

The LR video descriptions may be transmitted in one or more transport streams to a client device that is configured to form a bitstream on the basis of media data in the one or more transport streams. The bitstream may be provided to the input of a decoding device, which may extract media data of a single resolution component from the bitstream and decode the media data into video frames of a LR video stream. Alternatively, the decoding device may extract media data of two or more resolution components from the bitstream, decode media data of each of the resolution components into video frames and combine the video frames of the two or more resolution components in high resolution video frames.

The high resolution video signal and the associated low resolution video signals may be determined in different ways. For example, spatially shifted low resolution versions generated by the spatial subsampling of the HR video frames may be used to form different LR descriptions. Alternatively, the HR video frames may be subsampled in different ways in order to generate different low resolution versions.

Alternatively, multiple low resolution descriptions may be generated by capturing the same scene by multiple low resolution imaging devices, e.g. cameras or the like, wherein the different low resolution imaging devices have different camera settings in terms of position and/or optical parameters. In that case, the LR descriptions of the HR video frame may be considered as multiple observations of the same scene through slightly shifted camera positions. Alternatively, the low resolution descriptions may be generated by encoding multiple times the same source video, this source video being downscaled and encoded with different quality settings for each of the encoding instance.

As will be described hereunder in more detail, the coding schemes in this disclosure provide spatial scalability in a coding system with low implementation costs. The simplicity, as can appreciated by one skilled in the art, comes from the fact that the decoding of each LR description boils down to a regular non-scalable video decoding operation. This way, one may elaborate a hardware implementation of the schemes presented in this disclosure by duplicating, or at least reusing, existing hardware implementations as many times as the bitstream carries LR descriptions. The coding schemes in this disclosure may be implemented as pre-processing and post-processing steps into a known coding standards, e.g. a AVC or HEVC coding process, so that only signalling describing the applied pre-processing steps needs to be added in these standards in order to enable the invention. This way, the fundamental design of these standards and all the existing tools provided by these standards can be used seamlessly in combination with the invention. Additionally, the coding scheme in this disclosure may be implemented as pre-processing and post-processing steps outside of any known and future coding standard in which case only decoders or applications aware of the specific bitstream will be able to properly render the intended video signal.

In an aspect the invention may relate to a method of forming a video signal by a decoder device wherein the method may comprise: receiving a bitstream and decoder information, the decoder information signaling a decoder device the presence of one or more resolution components in the bitstream for forming a video signal, a resolution component representing a spatially subsampled version of a first video signal having a first resolution, the one or more resolution components being part of a group comprising a plurality of resolution components on the basis of which the first video signal is reconstructable; the decoder device parsing the bitstream and decoding the one or more resolution components into video frames on the basis of the decoder information wherein the decoder information may signal the decoder device the presence of one or more resolution components in the bitstream. The one or more resolution components may be part of a resolution component group, comprising a plurality of resolution components on the basis of which the first video signal is reconstructable.

The decoder information may signal that the bitstream only comprises one resolution component of the group. In that case, the decoder device may form a second video signal of a second resolution by decoding parsed parts of the bitstream representing the first resolution component, wherein the second video signal comprises video frames of a low-resolution version of the first video signal.

The decoder information may also signal that the bitstream comprises two or more resolution components of the group. In that case, the decoder device may form video frames by decoding parsed parts of the bitstream representing the two or more resolution components. In case the decoder information signals all resolution components of the group, the first video signal may be formed on the basis of the video frames. In case the decoder information signals some resolution components but not all resolution components of the group, a third video signal may be formed on the basis of the video frames, wherein third video signal is a low-resolution version of the first video signal and wherein the third resolution is higher than the second resolution and lower than the first resolution.

In a further aspect, the invention may relate to a method of forming a video signal by a decoder device wherein the method may comprise: receiving a bitstream and decoder information, said bitstream preferably comprising the decoder information, the decoder information signaling the decoder device the presence of one or more resolution components in the bitstream for forming a video signal, a resolution component representing a spatially subsampled version, preferably a polyphase subsampled version, of a first video signal having a first resolution, the one or more resolution components being part of a resolution component group, the group comprising a plurality of resolution components on the basis of which the first video signal is reconstructable; the decoder device parsing the bitstream and forming a video signal, said forming comprising decoding the one or more resolution components in to video frames on the basis of the decoder information, wherein: if the decoder information signals that the bitstream comprises only one first resolution component of the group, said forming comprising: decoding parsed parts of the bitstream representing the first resolution component into video frames representing a second video signal of a second resolution, the second resolution being lower than the first resolution; and, if the decoder information signals that the bitstream comprises the first resolution component and one or more further resolution components of the group, said forming comprising: decoding parsed parts of the bitstream representing the first resolution component and one or more further resolution components into video frames; and, reconstructing the first video signal on the basis of the video frames if the decoder information signals all resolution components of the group; or, else constructing a third video signal having a third resolution on the basis of the video frames, the third resolution being higher than the second resolution and lower than the first resolution.

The invention uses low-resolution resolution components (in short resolution components), representing different spatially subsampled versions of a high-resolution video signal. The resolution components may be part of a group of resolution components that are generated such that the high-resolution video signal can be reconstructed on the basis of all resolution components in the group.

Here, spatial subsampling is based on a sampling lattice. For example, a high resolution vide frame may be formed by using a high resolution sampling lattice wherein each sampling point in the sampling lattice forms a pixel in the high resolution video frame. Different types of low resolution video frames may be formed on the basis of the high resolution frames of a high resolution video signal by using different low resolution sampling lattices wherein a low resolution sampling lattice has a lower sampling density than the sampling lattice of the high resolution video frames.

In contrast with the downsampling operations known from SVC and SHVC wherein new pixel values of the video frames of the downsampled video signal are calculated on the basis of sets of pixel values in the video frames of the original high resolution video signal, the spatial subsampling operation does not change the pixel values. Spatial subsampling only selects a subset of pixel values from a set of pixels values forming an image frame. The spatial subsampling scheme allows very efficient reconstruction of the original video signal or a low resolution version thereof. Additionally, the spatially subsampled vide frames of the resolution components allow the use of super resolution techniques for constructing a high resolution video frame.

At least one resolution component in the group of resolution components may be used to form a low-resolution version of the high-resolution video signal. Moreover, all and/or different subsets of resolution components selected from the group of resolution components may be used to form different video signals of different resolutions versions of the high-resolution video signal. Here, the resolution of a video signal that is formed on the basis of all resolution components may be equal or proximate the resolution of the original high resolution video signal and the resolution of a video signal that is formed on the basis of a subset of resolution components is higher than the low-resolution version and lower than the high-resolution video signal.

The use of the resolution components in the decoding process provides the advantage that different video signals of different spatial resolutions may be reconstructed and displayed on the basis one resolution component or different combinations of resolution components, e.g. resolution component 1, resolution components 1+2, resolution components 1+2+6 or resolution components 1+2+, . . . , +N, etc. that are provided in the bitstream to a decoder. Decoder information in the bitstream signals a decoder which resolution components of the group of resolution components are present in the bitstream and what video signal should be formed on the basis of the resolution components.

The use of resolution components provides a coding system having spatial scalability that can be implemented in a pre-processing/post processing approach such that the individual resolution components, i.e. the different spatially subsampled versions of a high resolution video signal, can be encoded and decoded on the basis of well-known video codec standards, including AVC, HEVC, VP10, etc. and standards based or derived thereof.

In an embodiment, a polyphase subsampling scheme may be used in order to generate four spatially shifted resolution components. Polyphase subsampling allows very fast processing at the encoder and decoder side. In an embodiment, at least one of the resolution components may be formed on the basis of polyphaser subsampling filtered, preferably low-pass filtered, video frames of the high-resolution video signal. The filtering may be used to reduce artefacts that may be introduced by the polyphase subsampling process.

In an embodiment, the one or more further resolution components may have a decoding dependency, preferably a spatial decoding dependency, on (at least) the first resolution component. Video frames of a further resolution component may be formed on the basis of video frames of (at least) the first resolution component and residual video frames of a further resolution component wherein a residual video frame is formed on the basis of the difference between video frames of the first resolution component and video frames of the further resolution component. In this embodiment, a further resolution component may have a decoding dependency on the first resolution component and/or one or more other further resolution components in order to increase compression efficiency.

In an embodiment, the further resolution components or a substantial part thereof may be configured to only depend on the first resolution component. This way, a low-delay decoding scheme is provided that is suitable for parallel processing in the sense that the further resolution components can be decoded in parallel. In contrast, in scalable video coding schemes such as SHVC, layers have multiple dependencies (e.g. layer N depends on layer N−1, which in turn depends on layer N−2, etc.) which introduce delays that scale with the number of layers. Such scheme prevents parallelization of the decoding process.

Furthermore, in the coding scheme according to the invention each resolution component may be generated by spatial subsampling of a high resolution video signal. This way, each resolution component has the same resolution. Therefore, during decoding and encoding different resolution components of the same video signal may be processed without requiring down or upsampling operations as required when processing enhancement layers in SHVC. This way the complexity of the data processing may be reduced.

In an embodiment, at least two or more resolution components may have the same spatial resolution, the spatial resolution being smaller than the first spatial resolution of the first video signal. By keeping resolution of at least a number of spatial components the same so that the buffer settings for each those resolution components can be the same. This way the need for different buffer occupancies for each resolution layer as required in SHVC is eliminated.

In an embodiment, the encoded media data of the first resolution component in the bitstream are independently decodable. In another embodiment, the encoded media data of the one or more further resolution components in the bitstream only have a coding dependency on the first resolution component.

In an embodiment, the decoder information may comprise at least one of: at least one parameter indicative of the resolution of the first video signal, the second video signal and/or the third video signal; one or more resolution component identifiers identifying the one or more resolution components in the bitstream; information identifying the resolution component in the group of resolution components representing for forming the first signal and/or the resolution components in the group of resolution components for forming the second and/or third video signal; information on the spatial resolution of each resolution component; a parameter indicative of a super-resolution operation for forming the first or third video signal on the basis of the first and further resolution components; and, optionally, information needed for the indicated super-resolution operation.

In an embodiment, the bitstream comprises NAL units, preferably the decoder information being included in one or more non VCL NAL units; and/or, the one or more resolution components being included in one or more VCL NAL units.

In an embodiment, the NAL units may include at least one of: a non VCL NAL unit, preferably a SPS NAL unit, comprising a parameter (resolution_component_format_idc) indicative of the resolution component format; a non VCL NAL unit, preferably a VPS NAL unit, comprising one or more parameters (pic_width_in_luma_samples, and pic_height_in_luma_samples) indicative of the resolution of the video frames of the first video signal; a non VCL NAL unit, preferably a VPS NAL unit, comprising a parameter indicative of the spatial subsampling technique used for generating the one or more resolution components or a flag indicating that the one or more resolution components are determined on the basis of a polyphase subsampling technique;
a VCL NAL unit, preferably a slice segment, the VCL NAL unit comprising a header comprising a resolution component identifier for identifying a resolution component.

In an embodiment, the one or more resolution components in the group of resolution components are polyphase subsampled versions of the first video signal and wherein forming the first video signal or third video signal comprises: upsampling a video frame to the resolution format of the video frames of the first or third video signal; zero-padding the upsampled video frame; shifting the upsampled zero-padded video frame in accordance to its positions in a video frame of the first video signal or third video signal; and, adding the upsampled zero-padded video frame to video frames of the first or second video signal.

In an embodiment, the bitstream is a HEVC bitstream, the bitstream comprising decoder information for signalling an HEVC decoder that the video frames of the resolution components are temporally multiplexed. In an embodiment, the video frames of the resolution components may be arranged in an interleaved order.

In an embodiment, the bitstream is a HEVC bitstream, the decoder information signalling an HEVC decoder that the decoded video frames comprise a tiled arrangement of resolution components.

In an embodiment, the temporal multiplexed order of the video frames of the resolution components or the tiled arrangement of the resolution component schemes may be signalled in one or more NAL units to the HEVC decoder, preferably the one or more NAL units being one or more SEI messages.

In an embodiment, reconstructing the first or second video signal comprises: using a super-resolution video image reconstruction technique for generating video frames of the first or second video signal. In this embodiment, in case there is no or little information on the spatial subsampling that is used to generate the resolution components (e.g. the spatial displacement between the different resolution components is not known and needs to be estimated), the combiner may employ a well-known super-resolution technique in order to generate high resolution video frames. A super-resolution technique is a technique that may be used for determining a high resolution video signal on the basis of video frames of multiple resolution components of the same scene. In particular, if the images of the multiple resolution components are spatially shifted (e.g. over a sub-pixel distance) with respect to each other, then the information in the LR images may be used to reconstruct a high resolution image.

In a further aspect, the invention may relate to a method of forming a bitstream by an encoder device comprising:

forming a group of resolution components by spatial subsampling, preferably polyphase subsampling, video frames of a first video signal of a first resolution, wherein on the basis of the video frames of the group of resolution components the first video signal is reconstructable and wherein at least two or more resolution components have the same spatial resolution;

selecting one or more resolution components from the resolution component group and the encoder device forming a bitstream and decoder information on the basis of the one or more selected resolution components; preferably the bitstream comprising the decoder information, wherein:

if only a first resolution component is selected, said forming a bitstream and decoder information comprising:

said encoder device encoding a first resolution component of the group of resolution components, the first resolution component having a second resolution; and, generating information for the decoder to decode the one resolution component into a second video signal of a second resolution, the second resolution being lower than the first resolution; or, if the first resolution component and one or more further resolution components are selected, said forming said forming a bitstream and decoder information comprising:

said encoder device encoding the first resolution component and one or more further resolution components of the group of resolution components into a first bitstream part and one or more further bitstreams parts respectively; combining the first bitstream part and the one or more further bitstreams parts; and, generating information for the decoder to decode the one resolution component and the one or more further resolution components into video for reconstructing the first video signal if the decoder information signals to the decoder device that the bitstream comprises all resolution components of the group; or, else for constructing a third video signal of a third resolution, the third resolution being higher than the second resolution and lower than the first resolution preferably inserting the decoder information into the bitstream.

In an embodiment encoding one or more further resolution components of the group of resolution components may comprise determining first video frames on the basis of the first bitstream; determining one or more further residual video frames on the basis of the first video frames and video frames of the one or more further resolution components; encoding the one or more further residual video frames into one or more further bitstreams; and, wherein, if the decoder information signals the first resolution component and one or more further resolution components, the decoder information signalling the decoder device that the video frames of the first video signal and the third video signal are formed on the basis of the video frames of the first resolution components and the one or more further residual video frames of the one or more further resolution components.

In an embodiment, the method may further comprise: storing the first bitstream and the one or more further bitstreams and at least part of the decoder information in separate resolution component tracks, preferably a bitstream associated with a resolution component and at least part of the decoder information being stored as NAL units in a resolution component track; and, optionally, providing a base track associated with at least part of the resolution component tracks, the base track comprising a sequence of extractors, each extractor pointing to an entry in one of the resolution component tracks.

In another aspect, the invention may relate to a decoding device comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: forming a group of resolution components by spatial subsampling, preferably polyphase subsampling, video frames of a first video signal of a first resolution, wherein on the basis of the video frames of the group of resolution components the first video signal is reconstructable and wherein at least two or more resolution components have the same spatial resolution;

selecting one or more resolution components from the resolution component group and the encoder device forming a bitstream and decoder information on the basis of the one or more selected resolution components; preferably the bitstream comprising the decoder information, wherein:

if only a first resolution component is selected, said forming a bitstream and decoder information comprising:

said encoder device encoding a first resolution component of the group of resolution components, the first resolution component having a second resolution; and, generating information for the decoder to decode the one resolution component into a second video signal of a second resolution, the second resolution being lower than the first resolution; or, if the first resolution component and one or more further resolution components are selected, said forming said forming a bitstream and decoder information comprising:

said encoder device encoding the first resolution component and one or more further resolution components of the group of resolution components into a first bitstream part and one or more further bitstreams parts respectively; combining the first bitstream part and the one or more further bitstreams parts; and, generating information for the decoder to decode the one resolution component and the one or more further resolution components into video for reconstructing the first video signal if the decoder information signals to the decoder device that the bitstream comprises all resolution components of the group; or, else for constructing a third video signal of a third resolution, the third resolution being higher than the second resolution and lower than the first resolution preferably inserting the decoder information into the bitstream.

In an aspect, the invention may relate to an encoding device comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: forming a group of resolution components on the basis of a first video signal of a first resolution component by spatial subsampling, preferably polyphase subsampling, wherein on the basis of the group of resolution components the first video signal is reconstructable; encoding a first resolution component of the group of resolution components into a bitstream, the first resolution component having a second resolution representing a low-resolution version of the first video signal; and, determining decoder information for signaling a decoder device that the output bitstream comprises one resolution component of the group of resolution components and to form video frames of a second video of a second resolution; or, encoding a first resolution component of the group of resolution components into a first bitstream and encoding one or more further resolution components of the group of resolution components into one or more further bitstreams; forming an output bitstream on the basis of the first bitstream and the one or more further bitstreams; determining decoder information for signaling a decoder device that the output bitstream comprises first bitstream parts associated with the first resolution component and one or more further bitstream parts associated with the one or more further resolution components and to form video frames of the first video signal if all resolution components of the group are signalled and to form video frames of a third video signal of a third resolution, the third video signal being a low-resolution version of the first video signal, the third resolution being higher than the second resolution and lower than the first resolution.

The invention may further relate to a computer program product comprising software code portions configured for, when run in the memory of a computer, executing the method steps according to any of method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 8 depicts a SEI message for signaling decoder information according to an embodiment of the invention.

FIG. 11 depicts a SEI message for signaling decoder information according to an embodiment of the invention.

DETAILED DESCRIPTION

Figure 1:
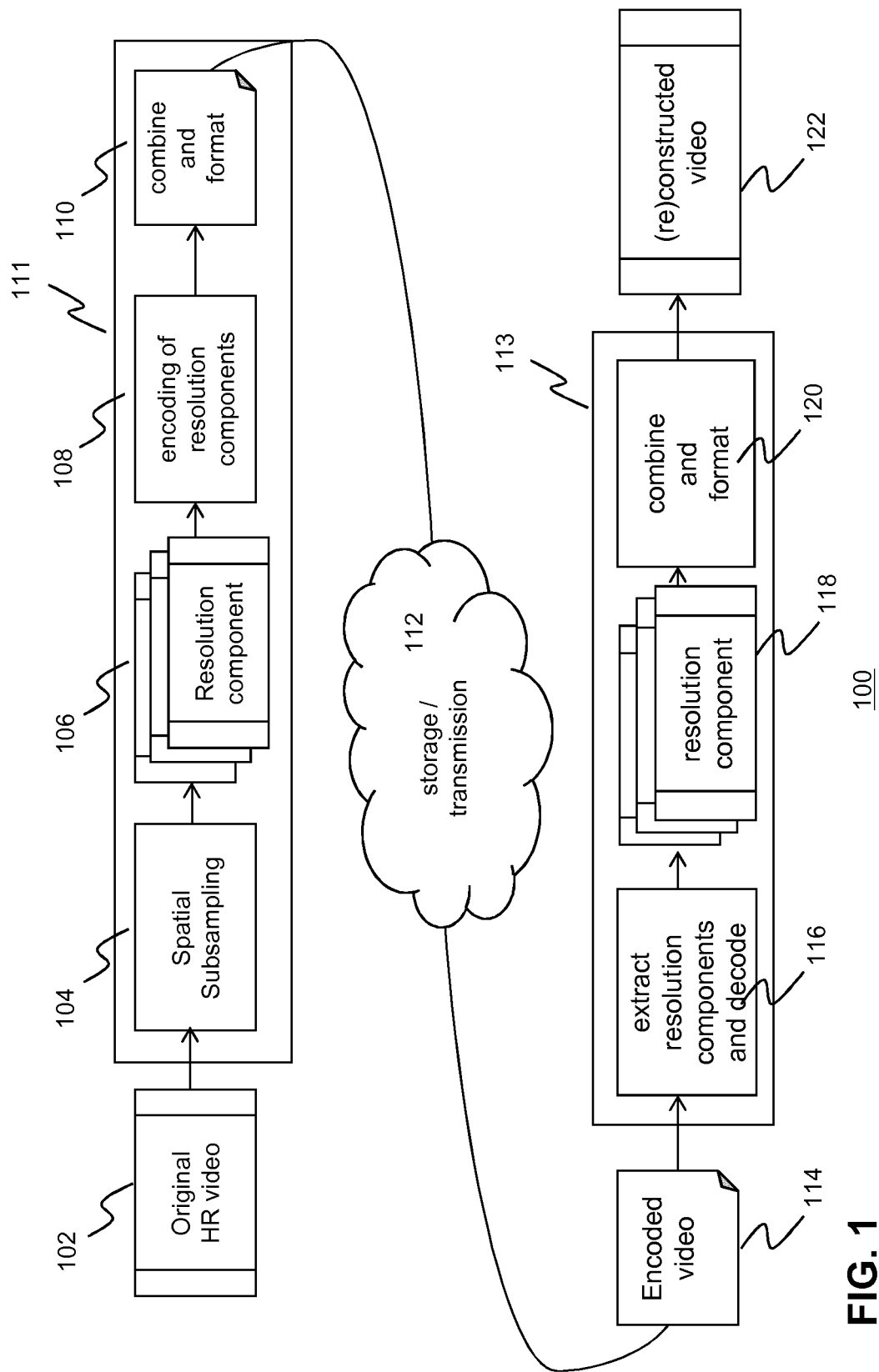
FIG. 1 depicts a schematic of a coding system according to an embodiment of the invention.

FIG. 1 depicts a schematic of the coding system according to an embodiment of the invention. In particular, FIG. 1 depicts a coding system comprising an encoding device 111 and an associated decoding device 113. The encoding device may be implemented as a network encoder configured to receive multiple LR video signals of the same or substantially the same scene. In an embodiment, the multiple LR video signals (LR descriptions) may be generated on the basis of a HR video signal 102. For example, in an embodiment, a spatial subsampling technique 104, such as a polyphase subsampling technique, may be used in order to generate multiple LR descriptions 106 on the basis of the HR video signal. Each of the LR descriptions may then be encoded into multiple encoded LR descriptions.

The LR descriptions may be encoded on the basis of a predetermined coding standard, e.g. AVC, HEVC, VP9, etc. Further, at least one of the LR descriptions is encoded such that it can be independently decoded and thus providing video frames of a predetermined quality, e.g. HD quality or the like, of the original video without the need of information of the other LR video signals. In an embodiment, one or more coding dependencies may exist between the one or more encoded LR descriptions in order to eliminate redundancy between spatial components. This way a higher compression efficiency may be achieved.

Thereafter, an encoded HR video signal may be formed on the basis of the multiple LR descriptions. During the formation of the encoded video signal comprising the LR descriptions, decoder information may be added to the encoded video signal. The decoder information may comprise information on the LR descriptions in the video signal, how the LR descriptions were obtained, e.g. the type of spatial subsampling, the number of LR descriptions, the format of the LR descriptions, e.g. the resolution and bitrate, etc.

A combiner 110 may combine, e.g. multiplex, the encoded LR descriptions and packetize the encoded media data of the different LR descriptions in a suitable data format for storage and transmission 112. This way, the encoded media data of the LR descriptions may be transmitted as a video stream 114 of a suitable data format, e.g. an MPEG-type transport stream, to one or more media processing devices comprising a decoder device 113.

The media device may comprise a client device for receiving the video stream, extracting the encoded media data from the video stream and forming bitstreams representing encoded content of the LR representations which is presented as a bitstream to the input of the decoder. A bitstream parser may extract the bitstreams of the encoded LR descriptions. Each LR description bitstream is subsequently decoded into LR video frames 116. High resolution video frames may be formed by combining video frames of different LR descriptions, i.e. video frames of different LR descriptions of the same or at least substantially the same time instance. The combiner may use decoder information in the received video stream in order to correctly form one HR video frame on the basis of multiple LR video frames. The combiner may include a process that is the inverse of the spatial subsambling technique.

In case there is no or little information on the spatial subsampling that is used to generate the LR descriptions (e.g. the spatial displacement between the different LR descriptions is not known and needs to be estimated), the combiner may employ a well-known super-resolution technique in order to generate high resolution video frames. A super-resolution technique is a technique that may be used for determining HR images on the basis of multiple LR images of the same scene. In particular, if multiple low-resolution images are spatially shifted (e.g. over a sub-pixel distance) with respect to each other, then the information in the LR images may be used to reconstruct a HR image.

Examples of super-resolution techniques are described in the article by Sung Cheol Park et. al., "Super-Resolution image reconstruction: a technical overview", IEEE signal processing magazine, May 2003, pp. 21-36, which is hereby incorporated by reference. Examples of super-Resolution image reconstruction algorithms described in this article that may be used to reconstruct the HR video frames include, non-uniform interpolation, reconstruction in the frequency domain, regularized super-resolution reconstruction, projection onto convex sets reconstruction, ML-POCS hybrid reconstruction, iterative back-projection reconstruction, adaptive filtering reconstruction and motionless super-resolution reconstruction. For real-time applications, an adaptive filtering super-resolution reconstruction technique or an interpolation super-resolution reconstruction technique are preferred super-resolution techniques.

Figure 2A:
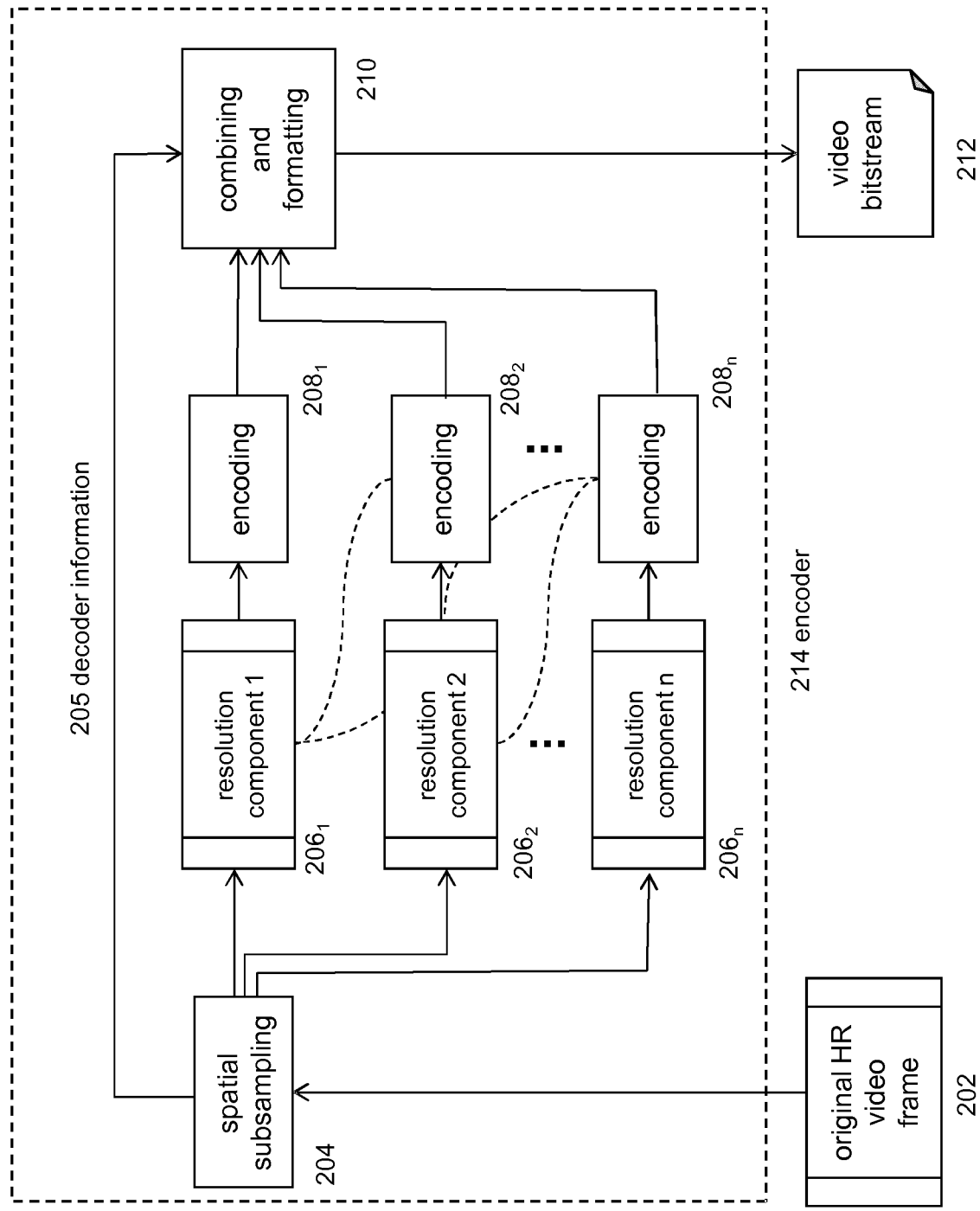
FIG. 2A depicts a schematic of an encoding system according to an embodiment of the invention.
Figure 2B:
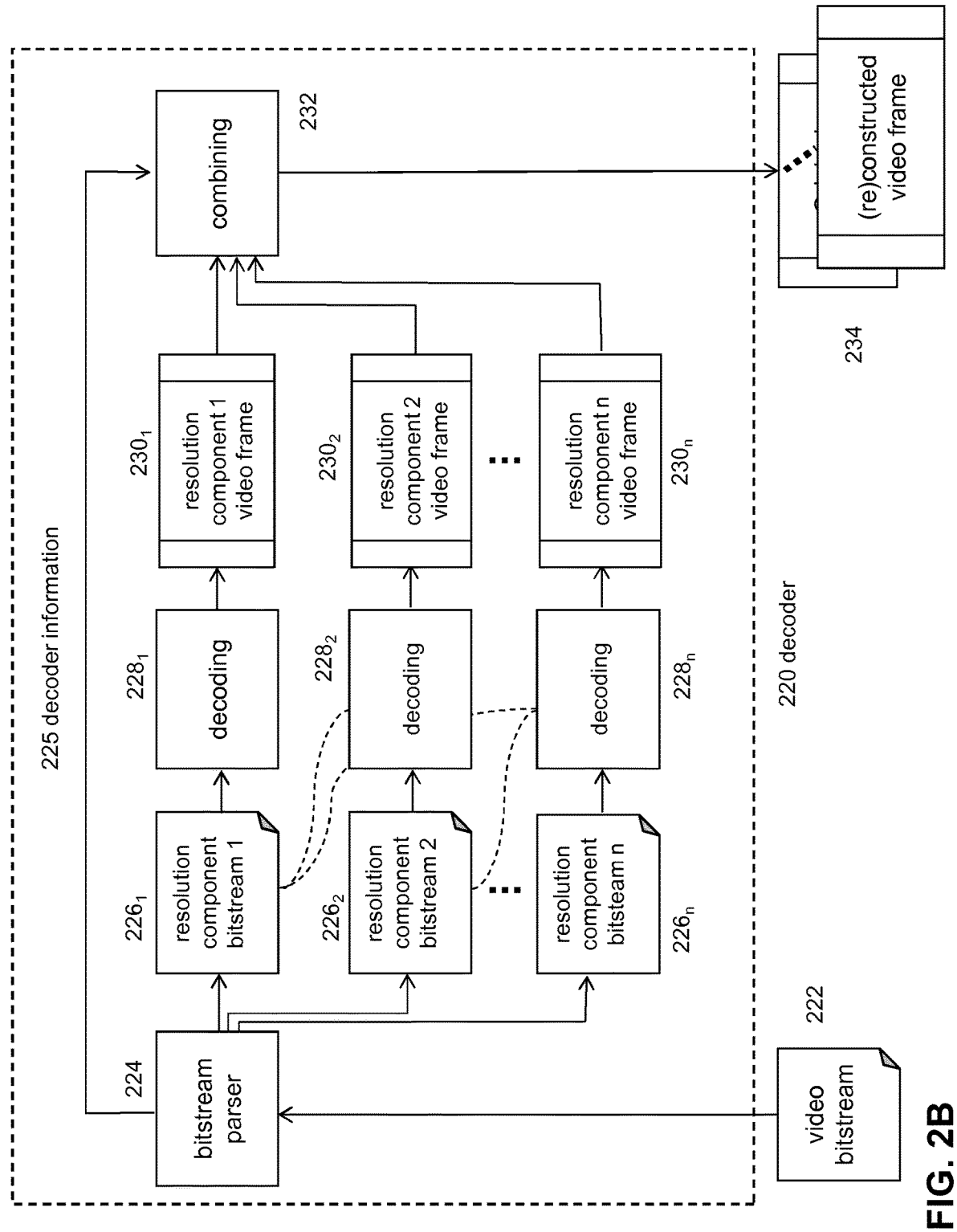
FIG. 2B depicts a schematic of an encoding system according to an embodiment of the invention.

FIGS. 2A and 2B depict schematics of parts of a coding system according to various embodiment of the invention. In particular, FIG. 2A depicts an overview of the encoding process executed by an encoding device according to an embodiment of the invention. These steps may include the generation of a plurality of low-resolution components (steps $206_{1-n}$). These low-resolution components are hereafter simply referred to as resolution components.

In an embodiment, the formation of (video frames of) different resolution components may involve spatial subsampling of video frames of a high resolution video signal.

In an embodiment, one of the resolution components may be low-pass filtered. This low-pass filtered video frames of the resolution component may be intended as output of the decoding process when only low resolution decoding of the bitstream is performed. Low-pass filtering may be necessary when the input signal contains high frequencies. In that case, an anti-aliasing filter may be applied to produce at least one resolution component that is suited for display. Such filter may be implemented together with a low-pass filter.

Information on the different resolution components that is needed for the reconstruction of a high resolution video is collected and inserted by the encoder as decoder information 205 in the bitstream when it is build. Decoder information may include information that is needed to reconstruct one or more high-resolution versions on the basis of the resolution components in the bitstream.

Each resolution component may be encoded into a bitstream by an encoder process (steps $208_{1-n}$) executed inside the same or in different encoder instances 214. The single encoder instance approach has the advantage that it makes the encoding of the resolution components using coding dependencies between the resolution components (represented by dash arrows) easier. Also, at least part of the resolution components may be encoded in parallel or at least partly in parallel depending on the chosen approach.

In an embodiment, coding dependences between one or more of the different resolution components may exist. The encoding may be based on well-known video coding standards including but not limited to e.g. MPEG-4 part 10 AVC/H.264, HEVC/H.265, etc. These coding standards may include known techniques like quantisation, inter/intra prediction, frequency transforms, entropy coding, etc.

A combiner may generate a bitstream on the basis of the bitstream outputs of the encoder instance(s) and the decoder information in accordance with a predetermined bitstream syntax (step 210).

The decoder information in the bitstream of the decoder output may include one or more of the following parameters and/or information:

In an embodiment, the bitstream may include at least one parameter that is indicative of the resolution or the different resolutions in which the video signal may be rendered when combining video frames of the resolution components in the bitstream. This parameter may be used by the decoder to set the size of the output buffer.

In an embodiment, the bitstream may include (a list of) resolution component identifiers identifying the resolution components available in the stream.

In an embodiment, the bitstream may include information identifying that resolution components that are needed in order to form a predetermined high resolution video stream.

In an embodiment, the bitstream of the encoder output may have a NAL unit structure for independently storing Video Coding Layer (VCL) NAL units of different resolution components.

In an embodiment, the bitstream may comprise at least one parameter indicative of the spatial resolution of each resolution component (either explicit or implicit when derived from the highest resolution that can be rendered);

In an embodiment, the bitstream may comprise at least one parameter indicative of a super-resolution operation that may to be performed to form video frames of a high resolution video signal on the basis of the video frames of two or more resolution components; and, optionally, super-resolution parameters that are needed for the indicated super-resolution operation.

The combiner may combine the bitstreams of the encoded resolution components and at least part of the above-described decoder information into a bitstream that has a syntax that can be interpreted and parsed by a decoder device (step 212). Further, the bitstream may be inserted in a suitable data container that enables transmission of the video bitstream to a decoder device.

FIG. 2B depicts a schematic of a decoder according to an embodiment of the invention. In particular, FIG. 2B depicts an overview of the decoding process executed by a decoder 220 according to an embodiment of the invention. The process may comprise receiving a video stream comprising one or multiple resolution components and decoder information associated with the one or multiple resolution components. Such video stream may be generated by an encoder process as described with reference to FIG. 2A.

The process in FIG. 2B may start with receiving the video bitstream comprising the resolution components and the decoder information and feeding the bitstream to an input of a bitstream parser (step 222). The bitstream parser may extract the decoder information 225 from the bitstream (step 224) and use the decoder information in order to determine the one or more resolution components that are available in the bitstream and the resolutions of the video signals that may be formed on the basis of one or more resolution components. The decoder may further receive information which resolution components are necessary for rendering a high-resolution video signal.

Based on the selected high-resolution video signal to be rendered, the bitstream parser may start parsing the video bitstream and extract the resolution components (steps $226_{1-n}$) that are needed in the formation of the selected high-resolution signal and feed the extracted resolution components as decoder compliant bitstreams to the input of the decoder. The decoder may decode the resolution components $228_{1-n}$ and may generate video frames associated with the resolution components (steps $230_{1-n}$). Video frames of the resolution components may be combined and formatted into a video frame of the selected high resolution.

A super-resolution technique may be used for determining the high resolution video frame on the basis of the video frames of the resolution components. In an embodiment, such super-resolution technique may include an upscaling operation for upscaling the resolution of a video frame of a resolution component; and, combining the upscaled video frames on the basis of one or more parameters that are indicative of the contribution of each of the upscaled video frames in the process of combining pixels of the upscaled video frames into recombined high resolution video frames (step 234). These one or more parameters may be sent by the bitstream parser to the combiner.

Figure 3:
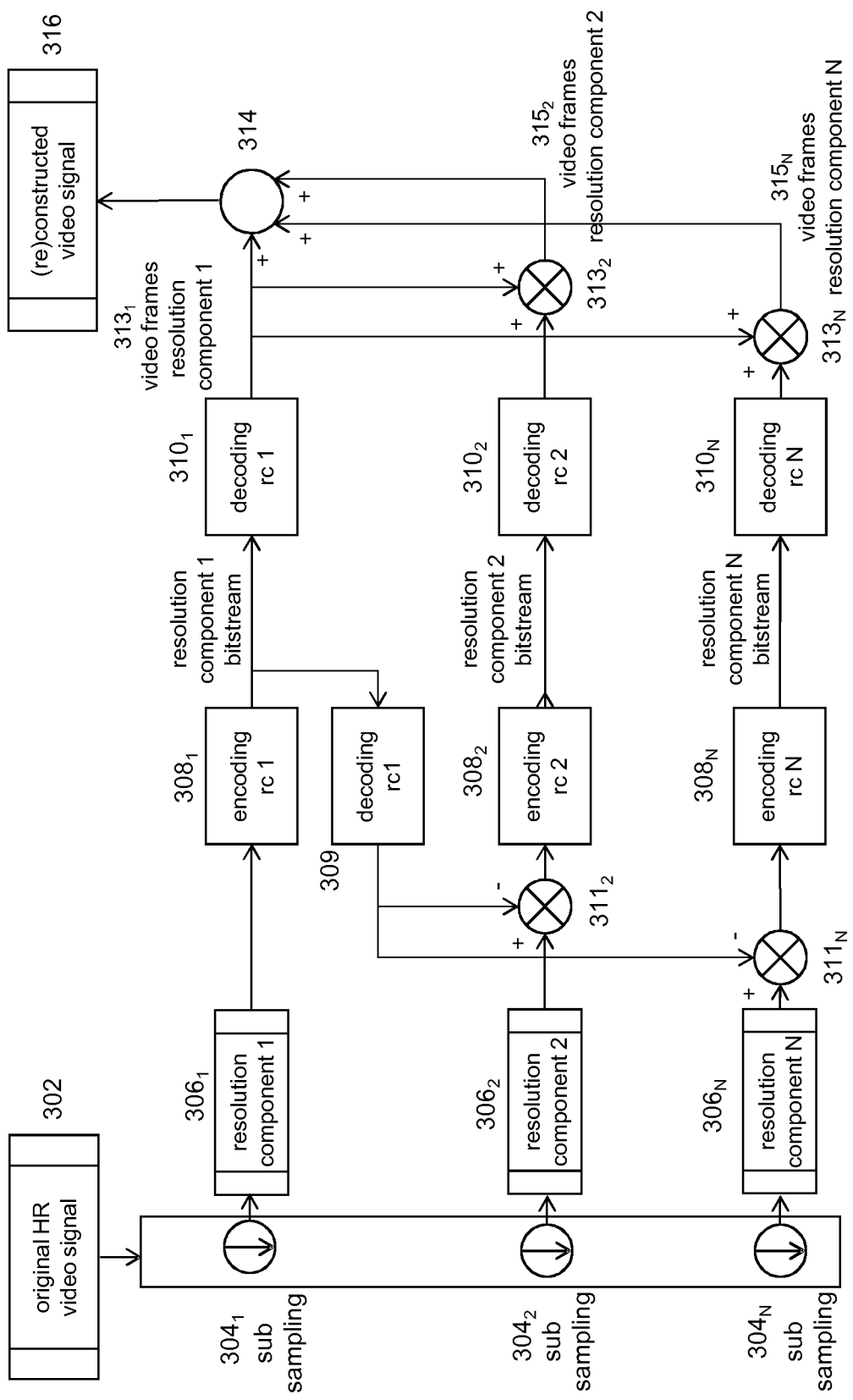
FIG. 3 depicts a schematic of a coding system according to an embodiment of the invention.

FIG. 3 depicts an example of a video coding system according to an embodiment of the invention. In particular, FIG. 3 depicts an embodiment wherein the original video signal is spatially subsampled in N resolution components and subsequently encoded into N resolution components. Preferably, in an embodiment, the subsampling operation is a polyphase subsampling. Polyphase subsampling will be described hereunder in more detail with reference to FIGS. 4 and 5.

As shown in FIG. 3, the first resolution component $306_1$ may be generated by a first spatial subsampling process $304_1$ of the original video signal 302. The first resolution component may be encoded by an encoder $308_1$ without any encoding dependencies on other resolution components. The encoded first resolution component may be decoded by a decoder $310_1$ into a reconstructed first low-resolution video signal $312_1$ that may be rendered as a low-resolution video signal 316.

Further resolution components $306_{2-N}$ may be generated by further subsampling processes $304_{2-N}$ of the original video signal. For example, a second resolution component $306_2$ may be generated on the basis of a second spatial subsampling process $304_2$ and a N-th resolution component $306_N$ may be generated on the basis of an N-th spatial subsampling process $306_N$. Each spatial subsampled resolution component may represent a spatially shifted low-resolution sample of the original video signal. In an embodiment, polyphase subsampling may be used as a spatial subsampling technique.

In this particular embodiment, the further resolution components may be encoded using a dependency on the first resolution component. To this end, a bitstream representing the encoded first resolution component may be decoded (step 309) into video frames that are combined with the video frames of a further resolution component, e.g. the second resolution component $306_2$, before it is fed into the input of the encoder $308_2$. In an embodiment, the process of combining the video frames of the first and a further resolution component (step $311_{2-N}$) may include determining a difference signal (also known as residual signal) wherein at least part of a video frame of the first resolution component is subtracted from a video frame of the further resolution component, e.g. the second resolution component. Hence, on the basis of video frames of the first resolution component and a further resolution component residual video frames of the further resolution component are generated and fed to an encoding process, which generates a bitstream associated with the further resolution component. The thus generated resolution bitstreams are subsequently combined into a video bitstream (not shown) in a similar way as depicted in FIG. 2A.

During the formation of the encoded video bitstream at least part of the decoder information, i.e. information on (the processing of) each resolution component (e.g. meta data on the subsampling process, filtering, coding dependency, etc.) may be inserted in the bitstream that is generated by the encoder so that a decoder device is able to reconstruct a video signal on the basis of the first resolution component or the first resolution component and one or more further resolution components.

In this embodiment, a video signal may be reconstructed on the basis of the first resolution component and one or more of the further decoded resolution components, which have a coding dependency on the first resolution component in order to achieve compression efficiency. Information on the coding dependency of a further resolution component on the first resolution component may be signaled in the video bitstream to the decoder. Hence, when resolution components and the decoder information in the encoded video bitstream is transmitted to a decoder, the decoder may parse the bitstream and extract the decoder information and the resolution components from the bitstream in a similar way as described with reference to FIG. 2B.

The extracted first resolution component bitstream may be fed to the decoder $310_1$ which decodes the first bitstream on the basis of the decoder information into first resolution component video frames $313_1$. In case it is desired to render content on the basis of the first resolution component, first resolution component video frames may be used to playout the content as the first resolution component was encoded without any coding dependency on other resolution components.

In case it is desired to render content on the basis of the first resolution component and one or more further resolution components, further resolution component bitstreams may be fed to the decoder $310_{2-N}$ which decodes the further bitstreams on the basis of the decoder information into residual video frames of the further resolution components. As the further resolution components, e.g. the second resolution component, have a coding dependency on the first resolution component, the video frames of the first resolution component is combined with the residual video frames of a further resolution component (the residual signal) (step $313_{2-N}$) in order to reconstruct video frames of a further resolution component $315_{2-N}$, e.g. video frames of second resolution component $315_2$.

Thereafter, the reconstructed video frames of the first resolution component and, possibly, the video frames of one or more further resolution components are combined into a reconstructed high resolution video signal 316. In the case of polyphase subsampling, the recombination process 314 may include upsampling of the video frames with zero padding of the resolution components followed by an addition of the thus formed video frames to reverse the polyphase subsampling (as explained in more detail with reference to FIG. 5) and to form a high resolution video signal 316. In the more general case of a spatial subsampling process, the recombination process 316 may be a well-known super-resolution algorithm.

Hence, the coding system of FIG. 3 provides the advantage that different high-resolution resolution video signals may be reconstructed on the basis of a first resolution component and one or more further resolution components, e.g. resolution component 1 or resolution components 1+2 or resolution components 1+2+, . . . , +N, etc. In scalable video coding (SVC), the layers have multiple dependencies (e.g. layer N depends on layer N−1, which in turn depends on layer N−2, etc.) which introduces decoding delays that increase with the number of layers. Such scheme prevents easy parallelization of the decoding process. In contrast, the coding process according to FIG. 3 comprises further resolution components that only depend on the first resolution component thus providing a low-delay decoding scheme that is suitable for parallel processing in the sense that the further resolution components can be decoded in parallel. Furthermore, each resolution component may have the same resolution thereby substantially reducing the complexity of the data processing. In contrast, layers in scalable video coding have increasing resolutions from the base layer to the highest enhancement layer in order to enable spatial scalability.

Figure 4A:
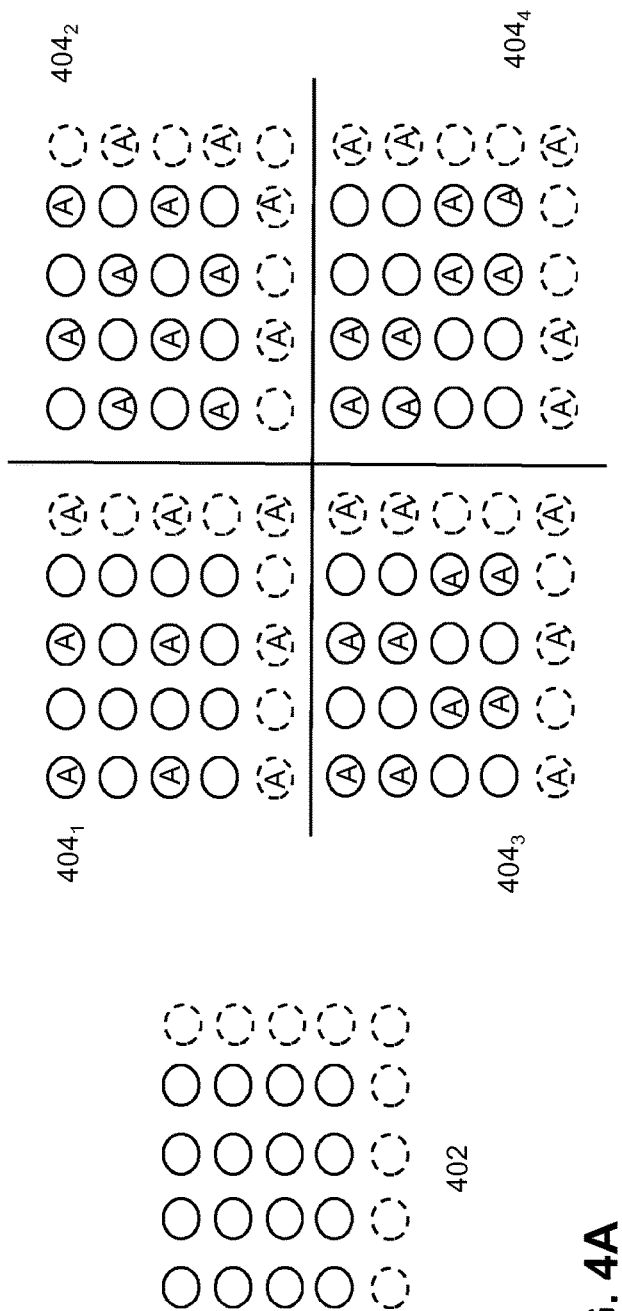
FIG. 4 depicts the concept of polyphase subsampling.
Figure 4B:
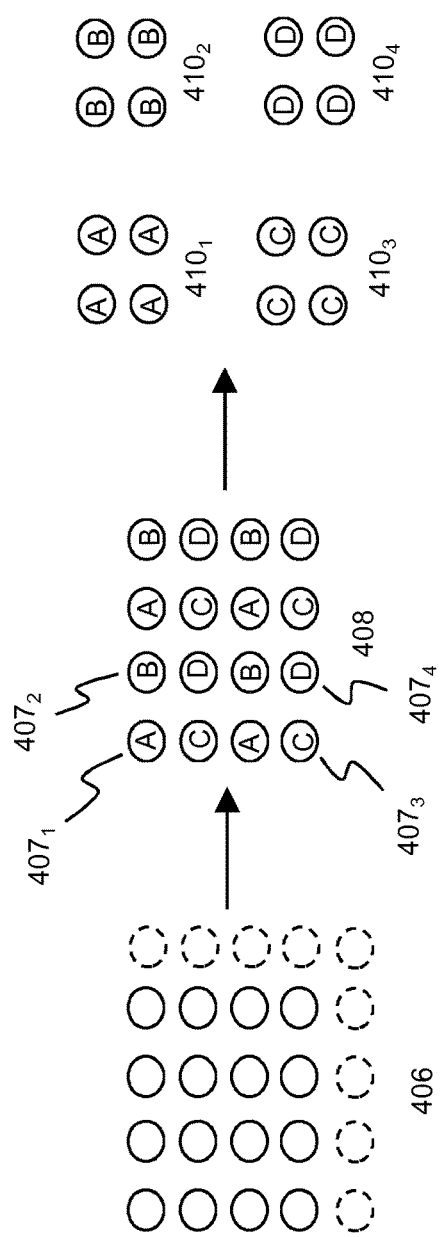

FIGS. 4A and 4B depict examples of spatial subsampling schemes that may be used in the embodiments described in this disclosure. FIG. 4A depicts part of a video frame 402 that may be formed by sampling a continuous image on the basis of a (regular) sampling lattice, e.g. a high resolution sampling lattice. Here, each sampling point in the sampling lattice forms a pixel in the high resolution video frame. Different types of low resolution video frames may be formed on the basis of the high resolution frames of a high resolution video signal by using different low resolution sampling lattices $404_{1-4}$ wherein a low resolution sampling lattice has a lower sampling density than the sampling lattice of the high resolution video frames. In contrast with the downsampling operations known from SVC and SHVC wherein new pixel values of the video frames of the downsampled video signal are calculated on the basis of sets of pixel values in the video frames of the original high resolution video signal, the spatial subsampling operation does not change the pixel values. Spatial subsampling only selects a subset of pixel values from a set of pixels values forming an image frame. The spatial subsampling scheme allows very efficient reconstruction of the original video signal or a low resolution version thereof. Additionally, the spatially subsampled vide frames of the resolution components allow the use of super resolution techniques for constructing a high resolution video frame. It is noted that the sampling lattices shown in FIG. 4A should be considered as examples of a large number of different sampling lattices that may be used.

Video frames produced by such low-resolution sampling lattice represent video frames of a resolution component. Different resolution components may be formed by subsampling the high resolution video frames on the basis of different sampling lattices. A group of sampling lattices may be selected such that the resolution components generated on the basis of this group of sampling lattices can be used to reconstruct the original high resolution video signal, i.e. reconstruct a video signal that is identical or almost identical to original high resolution video signal. Further, one or more sampling lattices may be selected such that of the resolution components generated on the basis of these one or more sampling lattices may be used to construct a low resolution version of the high resolution video signal.

In some embodiments, the sampling lattices used for subsampling a high resolution video frame may have the same sampling density. Resolution components generated on such sampling lattices have the same resolution. In other embodiments (some of) the sampling lattices may have different sampling densities. In that case, (some of) the resolution components have different resolutions. Moreover, as shown in FIG. 4A, in some embodiments, sampling lattices may have overlap, i.e. one or more sampling points in common. In another embodiment, there is no overlap between sampling lattices.

Hence, groups of resolution components may be generated on the basis of spatial subsampling as depicted in FIG. 4A. All the resolution components in the group may be used to reconstruct the original high resolution video signal and some of the resolution components in the group may be used to construct one or more low resolution versions of the high resolution video signal.

FIG. 4B depicts a polyphase subsampling scheme for generating a number of video frames (in the example four) of lower resolution on the basis of pixels 402 of a high resolution video frame. In polyphase subsampling an 4×4 pixel matrix may be subsampled into four 2×2 resolution components $403_{1-4}$ wherein in the 4×4 pixel matrix each resolution component represents a spatially shifted 2×2 pixel matrix $406_{1-4}$. The four resolution components form a group of resolution components (a resolution component group) that can be used by the decoder to reconstruct the original (high resolution) video signal.

A high resolution video frame may have a YUV-type colour format, e.g. a YUV 4:2:0 color format, 1920×1088 resolution, 24 frames per second, 240 frames. Subjecting this high resolution video frame to a polyphase spatial subsampling process with a with factor 2 (applied to Y, U and V) would result in four low-resolution video frames of the YUV 4:2:0 colour format, 960×544 pixel resolution and a frame rate of 24 fps.

The polyphase subsampling scheme has the advantage that it allows very fast operation at both encoder and decoder side, where pixel values are not changed. However, it may introduce visual artefacts due to spatial aliasing effects, if the original signal contains frequencies greater than twice the subsampling frequency. In that case, any of the four low resolution components may not be proper for rendering. To mitigate this effect, a post-filtering operation may be applied to enhance the output frames of the resolution components and cancel as much as possible these visual artefacts.

For example, in an embodiment, the polyphase subsampling may be performed after low-pass filtering of the high resolution frames. This way visual artefacts due to aliasing effect may be eliminated. When low-pass filtering, a post-processing step is needed to restore the original image before rendering. Otherwise at best, the reconstructed signal is the low pass version of the input signal. In lossless coding, reverting the low-pass filter to restore the HR image is doable to some extant with techniques such as inverse Wiener filter.

In lossy coding, the low-pass filtering may introduce some difficulties, especially in a low-bitrate encoding when the reconstructed signal is already severely damaged by the compression. Such a post-processing restoration scheme may only provide an estimate of the high frequencies that have been removed by the low-pass filter, but does not truly restore the original signal. That is, they do not reverse the degradation pixel-wise.

In a further embodiment, a hybrid low-pass filtering scheme may be combined with polyphase subsampling. For example, if at least one of the low-resolution components should be adequate for rendering in its own resolution, one resolution component may be generated based on a downsampled low-pass filtered version of the high-resolution signal while the other (three) low-resolution components may be generated based on polyphase subsampling of the non-filtered high-resolution signal.

Although the generation of spatial components are described with reference to polyphase subsampling, other types of spatial subsampling schemes may be also used. Examples of such schemes include quincunx and hexagonal subsampling or derivatives thereof. Based on such spatial subsampling schemes resolution components may be formed and used to reconstruct a high resolution video.

From a high resolution frame x, with N pixels (matrix N×1), a set of K low resolutions frames $y^{(k)}$, each with M pixels (matrix M×1), M<N. For each k-th low resolution frame $y^{(k)}$, the filtering of the HR frame is described by the matrix H (dimension N×N) and the subsampling is defined by the matrix A (dimension M×N). Thus the generative model is:

$$y^{(k)} = A^{(k)} H x$$

Here, it may be assumed that the same pre filtering is applied to the HR frame as described above. In another embodiment, each k-th decomposition may have a matrix H. In yet another embodiment, one resolution component may have a matrix $H_{LP}$ that is a low-pass filter of the HR frame (hence avoiding visual artefact as Moiré effect) while the other resolution components have the same matrix $H_1$ which is the identity matrix, meaning that the HR frame is not filtered and a pure polyphase subsampling is performed.

Based on the above-described generative model, many reconstruction methods may be applied to produce x̂, the estimation of the HR frame x using known super-resolution techniques as e.g. described in the above-mentioned article by Sung Cheol Park et al.

In an embodiment, the original high-resolution signal was decomposed using a polyphase subsampling operation as described in FIG. 4. In that case, the process to recombine the subsampled signals is simpler than in the more general case. The recombination process comes down to mapping each low-resolution resolution component onto the recombined picture according to the position the low-resolution component had in the original high-resolution signal. This recombination process includes upsampling each of the resolution component with zero padding and spatially shifting the matrix element to match the position of the resolution component in the video frame of the original video signal.

Figure 5:
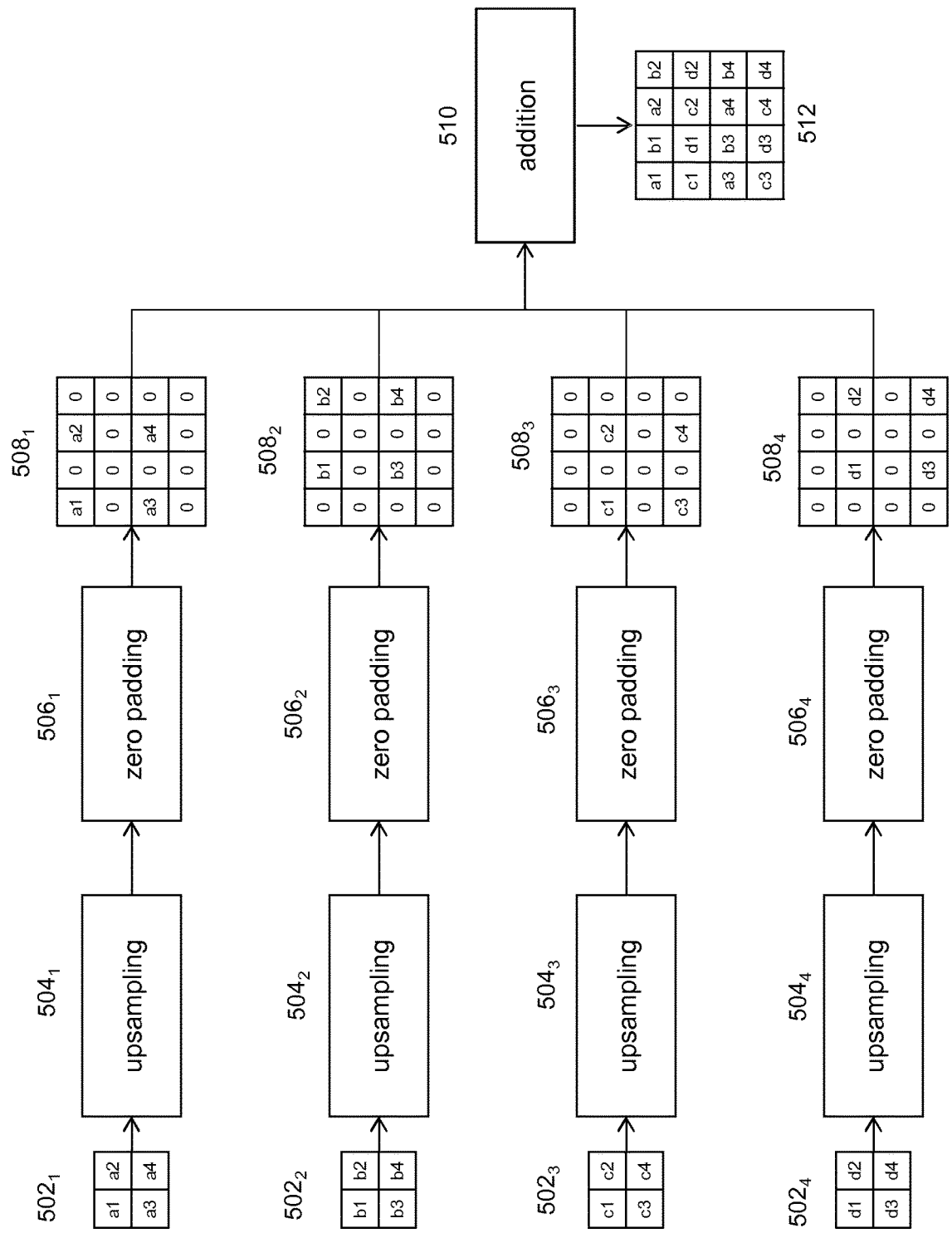
FIG. 5 depicts example of polyphase subsampling recombination process for use in a coding system according to an embodiment of the invention.

FIG. 5 depicts an example of a polyphase subsampled signal comprising a group of four low-resolution components $502_{1-4}$. The process may start with an upsampling process $504_{1-4}$ wherein a 2×2 block of pixels may be upsampled into a 4×4 block of pixels. Here, either the top left, top right, bottom left or bottom right corner may be selected as a reference. A zero-padding operation $506_{1-4}$ may be used in order to add zero's to the pixel locations that were created during the upsampling process thus forming a 4×4 upsampled zero-added block $508_{1-4}$. Thereafter, an addition process 510 may be used in order to combine the blocks into the (original) recombined high-resolution signal 512. The process could be optimized in terms of memory usage. For example, the resolution component pixels may be copied in the first upsampled matrix.

In an embodiment, in line with MPEG-4 part 10 AVC/H.264 and HEVC/H.265, the concept of NAL units may be used to signal the decoder information, e.g. the composition of the resolution components, to the decoder. Two main categories of NAL units exist: Video Coding Layer (VCL) NAL units and non Video Coding Layer (non-VCL) NAL units. In the HEVC standard, one of the non-VCL NAL units is referred to as the Sequence Parameter Set (SPS), which defines a syntax structure containing syntax elements that apply to zero or more entire CVSs as determined by the content of a syntax element found in the PPS referred to by a syntax element found in each slice segment header, where CVS stands for Coded Video Sequence. Examples of parameters in the SPS NAL unit are chroma_format_idc, defining the chroma subsampling scheme or pic_width_in_luma_samples and pic_height_in_luma_samples that respectively gives the width and height of the decoded picture in units of luminance sample. Examples of NAL units comprising decoder information and resolution component schemes signalled in the decoder information will be described hereunder in more detail with reference to FIG. 6A-6C.

| | Descriptor |
|---|---|
| seq_parameter_ser_rbsp( ) { | |
| ... | |
| resolution_component_format_idc | ue(v) |
| ... | |
| } | |

Figure 6A:
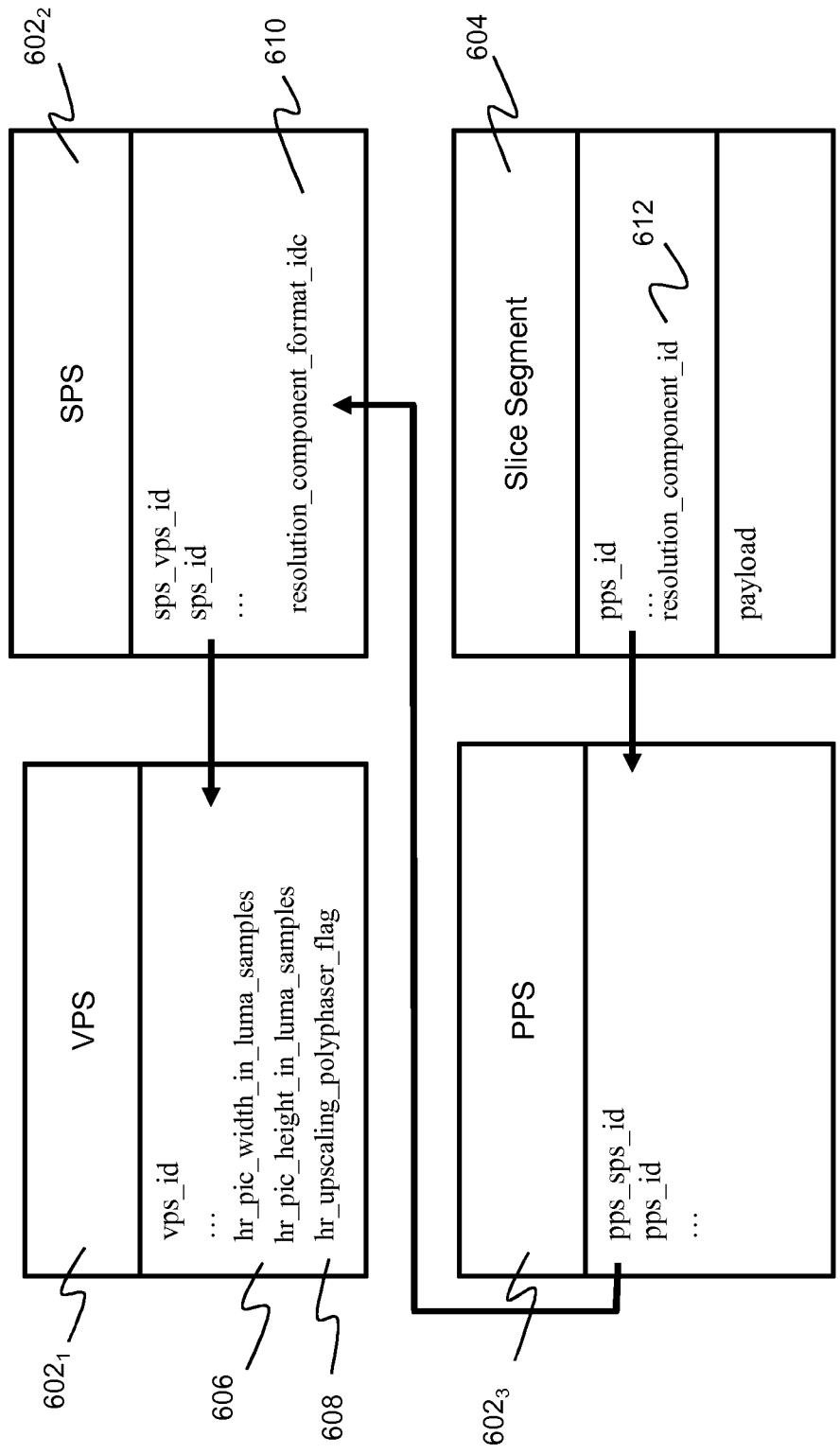
FIG. 6A-6C depicts NAL units comprising decoder information, including resolution component schemes, according to various embodiments of the invention.

FIG. 6A depicts examples of NAL units according to various embodiments of the invention. In particular, FIG. 6A depicts three non-VCL NAL units $602_{1-3}$ and a VCL NAL unit 604 comprising decoder information for signalling information on the resolution components in the bitstream. In an embodiment, a non-VCL NAL unit may comprise information for signalling information on the resolution component scheme that is used in the bitstream. Since the resolution component subsampling applies for multiple frames, in an embodiment, a parameter 610 (resolution_component_format_idc) indicative of the format of the resolution components in the bitstream may be signalled in a so-called SPS NAL unit $602_2$ (e.g. as used in the MPEG-4 part 10 AVC/H.264 or in HEVC/H.265) in the following way:

Depending on the value of this parameter a resolution component format may be signalled. Table 1 provides a non-exhaustive list of possible values for resolution_component_format_idc:

TABLE 1

Resolution component formats and their corresponding upscaling factors

| resolution_component_format_idc | Resolution component format | UpWidth | UpHeight |
|---|---|---|---|
| 0 | 4:2:0 | 2 | 2 |
| 1 | 4:2:2 | 2 | 1 |
| 2 | 4:4:4 | 1 | 1 |

In an embodiment, the resolution of the reconstructed high-resolution output video frame may be derived from the spatial resolution of each resolution component, signalled by pic_width_in_luma_samples and pic_height_in_luma_samples 606 in their associated SPS NAL unit (a VPS NAL unit $602_1$) as follows:

HRWidth=*pic*_width_in_luma_samples*UpWidth

HRHeigth=*pic*_height_in_luma_samples*UpHeight

In this embodiment, it may be assumed that all resolution components share the same SPS NAL units or at least have the same values of pic_width_in_luma_samples and pic_height_in_luma_samples in their respective SPS NAL units so that the HRWidth and HRHeigth values are non-ambiguous.

In an embodiment, the spatial components in a bitstream may be signalled to the decoder on the basis of a format syntax that is similar to well-known YUV color coding format, which comprises information on the individual components in a video frame. Therefore, the proposed notation for a resolution component format is w:a:b where wherein:
- the width parameter "w" represents the width in pixel of the 2-pixel height conceptual region of the highest resolution output frame of the bitstream;
- for a given resolution component, the first row resolution component parameter "a" represents the number of samples belonging to this resolution component in the first row of this w-wide pixel region;
- for the given resolution component, the second row resolution component parameter "b" represents the number of samples belonging to this resolution component in the second row of this w-wide pixel region.

Figure 6B:
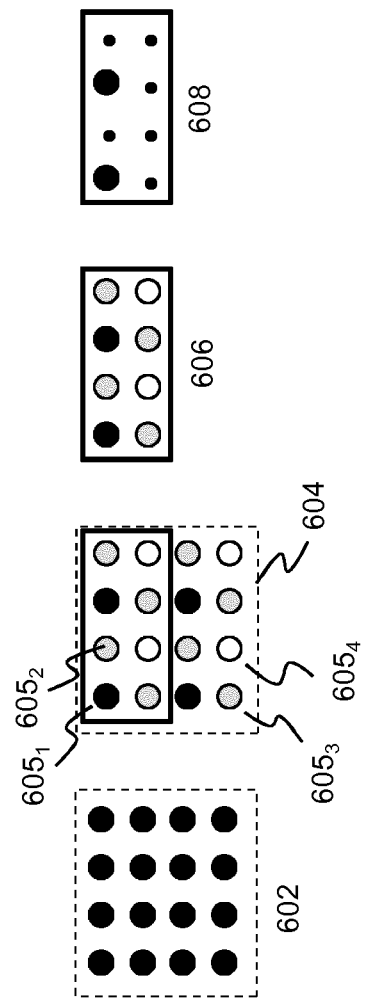

FIG. 6B illustrates the above-described resolution component format convention. The array of dots 602 represents a 4×4 pixel block of a high-resolution video frame. This array may comprise a number of resolution components, e.g. four different resolution components $605_{1-4}$, that are spatially ordered as depicted in 604. Then, analogous to the chroma subsampling scheme, a 4×2 pixel block 606 is analyzed with respect to its resolution components in each row in the sense that a first row resolution component parameter "a" represents the number of pixels in the first row of the 4×2 pixel block that belongs to a resolution component and the second row resolution component parameter "b" represents the number of pixels in the second row of the 4×2 pixel block that belongs to a resolution component. This way different resolution component schemes may be efficiently signaled to decoder wherein the resolution component format is in line with the well-known color component format.

Figure 6C:
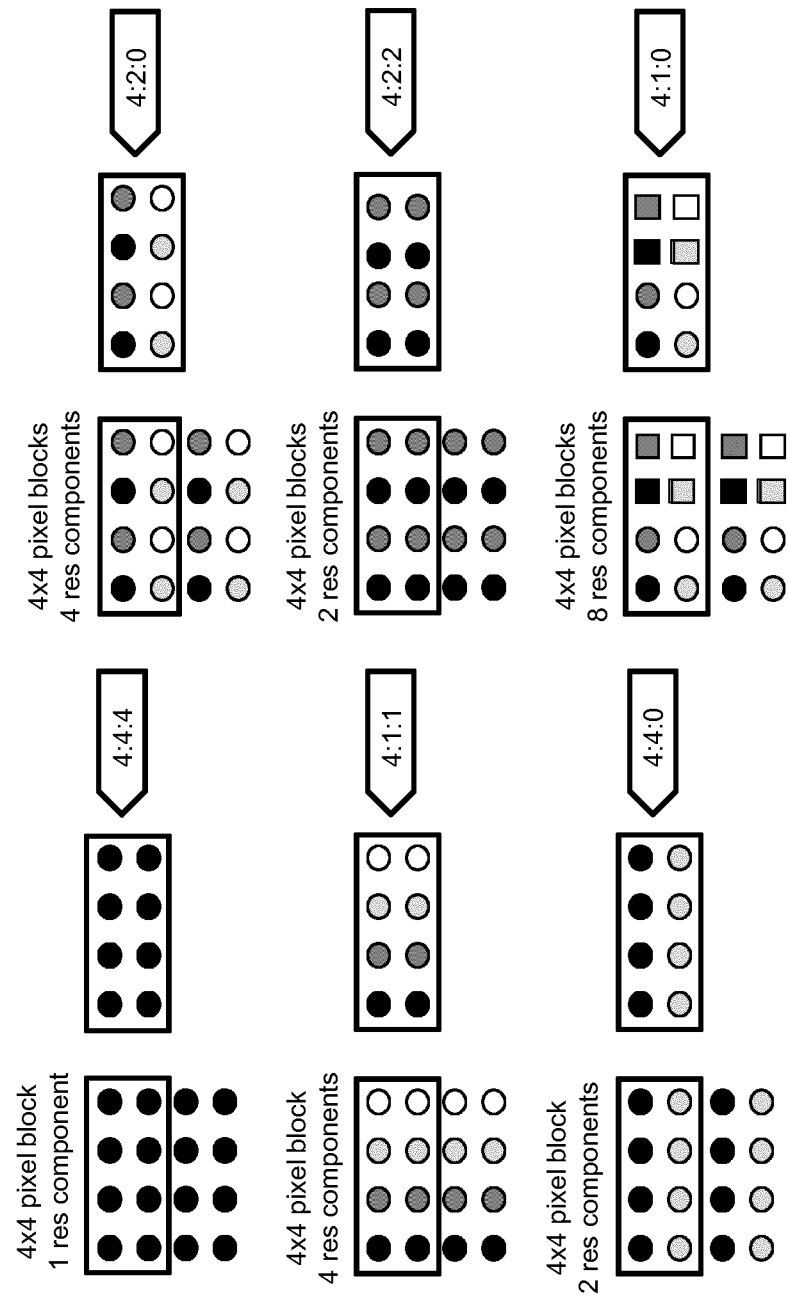

FIG. 6C depicts different examples of resolution component formats that may be used in the embodiments described in this disclosure. Here, the 4:2:0 format corresponds to a polyphase subsampling scheme where one sample of a resolution component may contribute up to 4 pixels of the output frame (1 to 4 depending on the applied downsampling operation, e.g. polyphase is 1). Similarly, the 4:4:4 format corresponds to a situation wherein the resolution components and the output frame have the same resolution. In this case there is no spatial subsampling. In the event that the bitstream contains multiple resolution components with the 4:4:4 format, this is similar to SNR scalability where the reconstructed output frame benefits from a better PSNR but not a higher resolution. Per resolution component format, a given number of resolution components are expected to convey the same full video signal as in the case where there is no spatial subsampling (4:4:4).

TABLE 2

Expected number of resolution components per format

| Resolution component format | Expected number of resolution components |
|---|---|
| 4:1:1 | 4 |
| 4:2:0 | 4 |
| 4:2:2 | 2 |
| 4:4:4 | 1 |
| 4:4:0 | 2 |

The expected number of resolution components may form a group of resolution components that can be used to reconstruct the original (high resolution) video signal. The video source that is represented by the bitstream is a sequence of pictures in decoding order, wherein the source and decoded pictures may each comprise one resolution component array wherein each resolution component array may comprise one or more colour sample arrays: Luma (Y) only (monochrome); Luma and two chroma (YCbCr or YCgCo); Green, Blue and Red (GBR, also known as RGB); or, arrays representing other unspecified monochrome or tri-stimulus colour samplings (for example, YZX, also known as XYZ).

From the resolution component format indicated by the parameter resolution_component_format_idc, the spatial resolution of each resolution component can be derived. This resolution component format may be signaled to the decoder in an SPS NAL unit as depicted in FIG. 6A.

In a further embodiment, each resolution component may have its own spatial resolution where multiple SPS NAL units are defined with different spatial resolutions for each of them, i.e. different pic_width_in_luma_samples and pic_height_in_luma_samples. In this embodiment, the resolution component format may be signaled in the SPS NAL unit $602_2$. In another embodiment, parameters may be used that indicate the output resolution of the HR frames, for example, in their common Video Parameter Set (VPS) NAL unit $602_1$.

| | Descriptor |
|---|---|
| video_parameter_set_rbsp( ) { | |
| ... | |
| hr_pic_width_in_luma_samples | ue(v) |
| hr_pic_height_in_luma_samples | ue(v) |
| ... | |
| } | |

In order to produce the HR frames, the decoder has to perform a mapping between pixels of the resolution component video frames and the pixels of the HR output video frame. The decoder process for combining video frames of the low resolution components into high resolution video frames may comprise the steps of:
1) upscaling each low resolution component video frame to the resolution of the HR video frame;
2) mathematically combining pixel values from the upscaled low resolution component video frames to determine each pixel value of the HR video frame.

In an embodiment, polyphase subsampling may be used. In that case, for the upscaling step (1), a dedicated parameter in a VPS NAL unit may signal the upscaling operation that needs to be performed. A flag 608 in the VPS NAL unit may indicate whether the sampling is a polyphase subsampling: This flag may signal the decoder that the LR video frames of the resolution components need to be

|  | Descriptor |
|---|---|
| video_parameter_set_rbsp( ) { | |
| ... | |
| hr_upscaling_polyphase_flag | u(1) |
| ... | |
| } | | upsampled to the resolution of the HR frame. Missing sample values between known sample values may be set to zero (padding). The resolution of the HR video frame may be given by the value of resolution_component_format_idc and the corresponding upscaling factor described in Table 1 above. In an embodiment, the resolution_component_format_idc and the corresponding upscaling factor may be signaled to the decoder in a NAL unit, e.g. the SPS NAL unit.

In another embodiment, the polyphase subsampling may be inherent to the resolution component format scheme. In that case, when resolution_component_format_idc is signaled to the decoder, it assumes that polyphase subsampling used.

In another embodiment, the header of the NAL unit 604 comprising the slice segment header may comprise a parameter 612 (resolution_component_id) indicative of the resolution component it is associated with, namely:

Here, the resolution_component_id values may range from 0 to

|  | Descriptor |
|---|---|
| slice_segment_header( ) { | |
| ... | |
| resolution_component_id | u(2) |
| ... | |
| } | | maximum_number_of_resolution_components_minus_1 as defined per resolution component format with polyphase subsampling (see Table 2). The numbering of the resolution component follows a raster scan order. As depicted in FIG. 4, a first resolution component $403_1$ "A" may be identified by a resolution component identifier id value 0, a second resolution component by a resolution component identifier id value 1 $403_2$ "B", a third resolution component by a resolution component identifier id value 2 $403_3$ "C" and a fourth resolution component by a resolution component identifier id value 3 $403_4$ "D".

Further, in order to combine pixel values from the upscaled low resolution component video frames (the above-described step 2), the selected polyphase subsampling scheme signaled in the bitstream determines where the LR pixels are located within the high-resolution frames. In an embodiment, pixels from the resolution component may be combined in a raster scan order. For example, in the case of four resolution components with resolution format 4:2:0, the raster scan order may be signaled to the decoder on the basis of the following table:

Table 3: raster scan order for a four resolution component scheme with resolution format 4:2:0.

In another embodiment, the spatial subsampling scheme is not or not completely predefined. In that case, the upscaling filter, the location of the pixels from the LR video frames and

| 0 | 1 | 0 | ... |
|---|---|---|---|
| 2 | 3 | 2 | ... |
| 0 | 1 | 0 | ... |
| ... | ... | ... | ... | the algorithm to compute the pixels in the HR video frames need to be signalled to the decoder. In a generic way, this information may be signalled in the decoder information e.g. on the basis of a vector per resolution component. In an embodiment, this information may be defined with sub-pixel accuracy, indicating the displacement of the resolution component with respect to an origin, e.g. the top left origin (0,0), in pixel units and an algorithm to compute every pixel value from the HR frame based on a recombination of the video frames of the low resolution components. In this case, the recombination process may be a super-resolution image reconstruction technique as described earlier in this disclosure.

Figure 7:
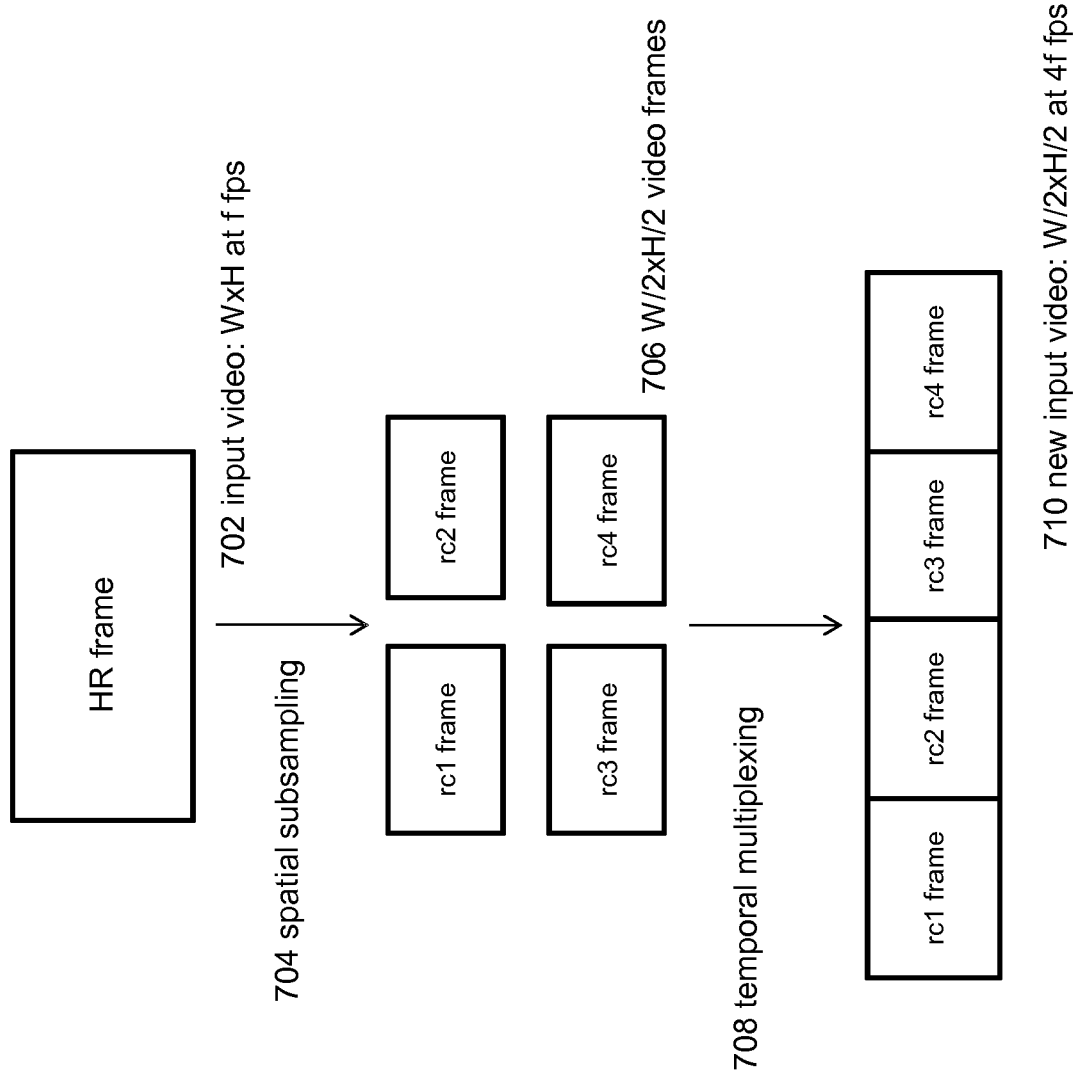
FIG. 7 depicts a process of forming an HEVC video signal comprising resolution components according to an embodiment of the invention.

In further embodiments, the resolution component scheme described in this disclosure may be implemented in a current video coding standard such as for example HEVC. FIG. 7 depicts a process of forming an HEVC video signal comprising resolution components according to an embodiment of the invention. In particular, low-resolution video frames 706, in this particular example four low-resolution video frames, may be created by spatially subsampling 704 high-resolution frames of an original video signal 702. In an embodiment, the formation of the resolution components may be regarded as a pre-processing step in the formation of a new video signal 710 that is fed to the input of an HEVC encoder. The video frames of the new video input signal may be formed by temporal multiplexing 708 video frames 706 of the resolution components. The new video signal has a frame rate that is four times the frame rate of the original video and spatial resolution divided by four. This way, the requirement on the decoding speed remains the same.

Although the implementation details of the process in FIG. 7 are described in the context of the HEVC video coding standard, it is submitted that the process may be implemented in any video coding standard.

The new input video signal 710 is fed to the input of a video encoder. The video parameters in the video signal reflect the characteristics of the new input video signal and not the original video signal.

For example, in FIG. 7 the spatial resolution is divided by four and the frame rate is multiplied by four. The multiplication of the frame rate by 4 has an impact on the decoding speed needed if the decoder must render the HR frames of the video at the original frame rate. Additionally, the encoder needs to be configured such that the video frames of the first resolution component rc1 only depend for prediction on video frames of the first resolution component in order to constitute an independently decodable bitstream of the first resolution component rc1. The other resolution components (rc2,rc3,rc4) may depend on the video frames of the first resolution component and possibly on video frames of other resolution components as well.

The bitstream may comprise decoder information to ensure proper decoding and rendering of the new video signal. That is, if the rendering of only one resolution component desired, e.g. the first resolution component, only one frame of every four frames needs to be decoded and rendered at a signalled frame rate divided by four. If the rendering of a high resolution version of the video is intended, the four resolution components need to be decoded, buffered output frames need to be recombined in high resolution video frames and rendered at a frame rate divided by 4 in order to move back to the initial frame rate.

Within the context of video coding standards that are based on NAL units, for example MPEG-4 part 10 AVC/H.264 or HEVC/H.265 video coding standards, decoder information may be transmitted in so-called SEI messages. In HEVC, decoder information may be conveyed by modifying the frame packing arrangement SEI message. The standard defines a type 5 as a frame packing arrangement comprising sequentially decoded frames having a temporal interleaving arrangement of alternating first and second frames.

| Value | Interpretation |
|---|---|
| 3 | Each component plane of the decoded frames contains a side-by-side packing arrangement of corresponding planes of two constituent frames as illustrated in FIG. D-4, FIG. D-5, and FIG. D-8. |
| 4 | Each component plane of the decoded frames contains a top-bottom packing arrangement of corresponding planes of two constituent frames as illustrated in FIG. D-6 and FIG. D-7. |
| 5 | The component planes of the decoded frames in output order form a temporal interleaving of alternating first and second constituent frames as illustrated in FIG. D-9. |
| 6 | Each component plane of the decoded frames contains the 4 resolution components in output order following a temporal interleaving of alternating first, second, third and fourth constituent frames. |

Hence, in the same way, a new type (type 6) of the frame_packing_arrangement_type may be defined for signaling the decoder that the sequentially decoded frames have a temporal interleaving arrangement of alternating first, second, third and fourth frames:

| Value | Interpretation |
|---|---|
| 0 | Unspecified relationship between the frame packed constituent frames |
| 1 | Indicates that the two constituent frames form the left and right views of a stereo view scene, with frame 0 being associated with the left view and frame 1 being associated with the right view |
| 2 | Indicates that the two constituent frames form the right and left views of a stereo view scene, with frame 0 being associated with the right view and frame 1 being associated with the left view |
| 3 | Indicates that the four constituent frames from the four resolution components of a polyphase susbsampling of factor 2, with frame 0 being associated, in a raster scan order, with the first resolution component, frame 1 with the second, frame 2 with the third and frame 3 with the fourth. |

Further, a new type may be added to the content_interpretation_type:

Here, type 3 of the content_interpretation_type signals the decoder that for each type of frame packing arrangement scheme (except type 6), there are two constituent frames that are referred to as frame 0 and frame 1 and that for a type 6 frame packing arrangement scheme, frame 2 and 3 exist wherein the raster scan order numbering is provided above in table 3 above.

Additionally, the current_frame_is_frame0_flag equal to 1 must be to put on the constituent frame 0 so that the decoder may derive which resolution component the current decoded frame belongs to by counting from this marker. Alternatively, the current_frame_is_frame1_flag, current_frame_is_frame2_flag can be specified in combination with the type 6 frame_packing_arrangement_type in order to signal the decoder the actual resolution component being present in the current frame. When all the above-mentioned flags are false, it means that the actual frame is the constituent frame 3.

Figure 9:
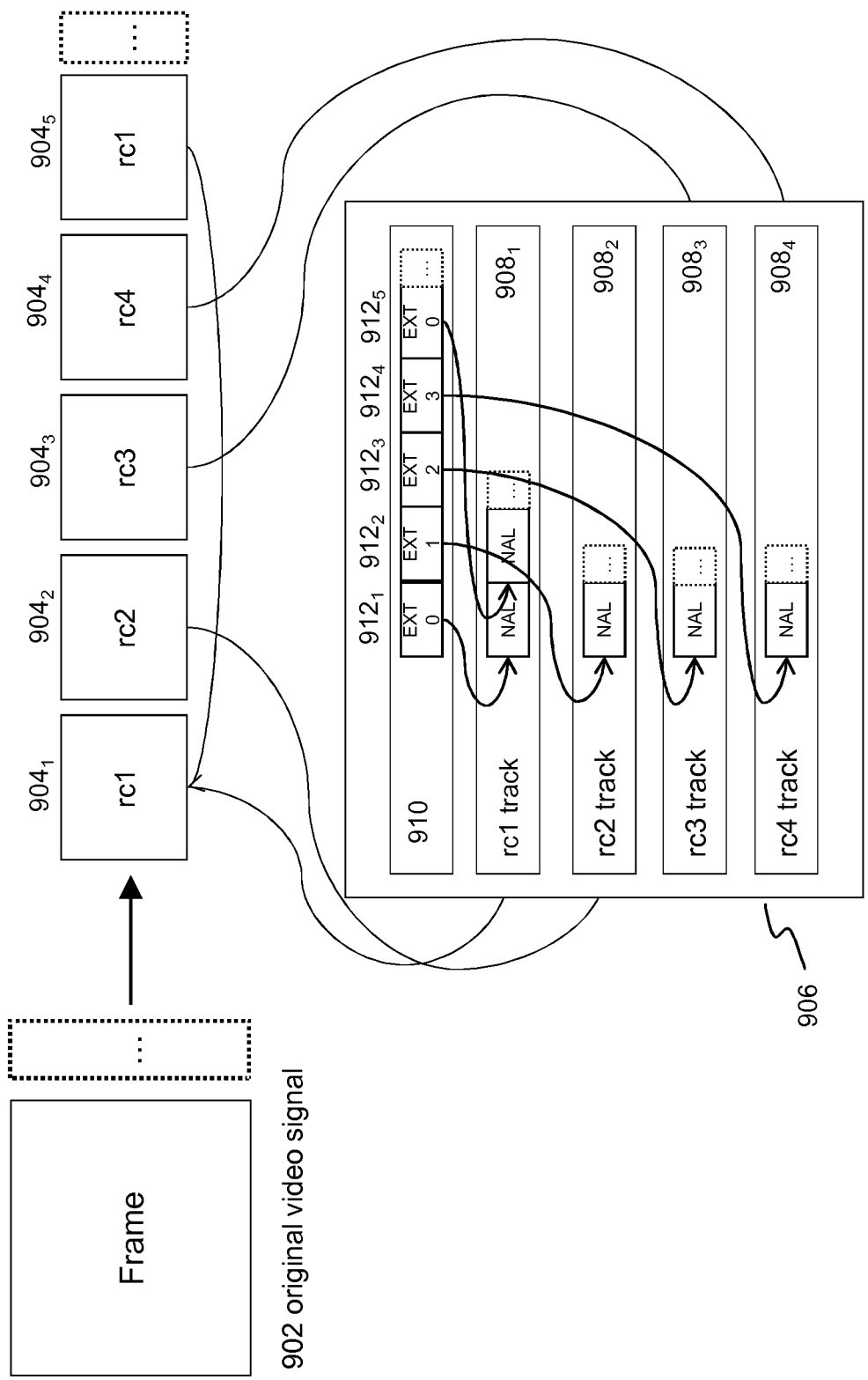
FIG. 9 schematically depicts a file format for storing resolution components according to an embodiment of the invention.

The syntax of the frame packing arrangement SEI message is modified to take into account the new frame packing arrangement type. FIG. 8 depicts a SEI message for signaling decoder information according to an embodiment of the invention. In order to enable the flexible delivery of such a bitstream, it is advantageous to enable the selection of one resolution component for the LR rendering. FIG. 9 schematically depicts a file format for storing resolution components according to an embodiment of the invention. In particular, FIG. 9 schematically depicts the encoding of frames 902 of an original video signal in a sequence of encoded video frames $904_{1-5}$ of, in this case four, resolution components rc1-rc4 and storage of each resolution component rc1-rc4 in a separate track $908_{1-4}$ of a suitable transport container, e.g. an ISOBMFF file 906. In an embodiment, the encoding process in FIG. 9 may be an HEVC encoding process as described with reference to FIG. 7 wherein an encoded HEVC video signal is formed comprising low resolution components and decoder information for informing the HEVC decoder about resolution components in the HEVC compliant bitstream.

In such a file, the base track 910 may contain extractors $912_{1-5}$ comprising pointers pointing to VCL NAL units of each of the resolution components, so that the original bitstream may be reconstituted. In an embodiment, in order to reduce the number of tracks, the LR0 track $908_1$ may be incorporated in the base track, since the LR0 track contains the data to render the LR frames which are always needed, no matter what the intended output resolution is.

The base track may comprise non-VCL NAL units, including PPS, SPS and VPS NAL units. In a further embodiment, if some non-VCL NAL units are specifically associated with the VCL NAL units of a resolution component, it is advantageous to store them in their respective track. This way, it may be avoided to pollute the base track with data that are not needed to decode a particular track. The transport of such a bitstream is not limited to the ISOBMFF standard but can be readily implemented in a similar way in other containers such as MPEG-2 TS.

Assuming the ISOBMFF variant is used for transporting the bitstream, the state-of-the-art Media Presentation Description (MPD) of the ISO/IEC 23009-1 MPEG DASH standard may be used to describe the track structure in the ISOBMFF file in a manifest file such that a DASH client device may select a particular resolution component from the available resolution components for rendering. In an embodiment, the resolution component may be defined as a separate Representation element in the manifest file (one per track) in case each resolution components is independently decodable. Alternatively, in another embodiment, the resolution components (or a part thereof) may be provided in a single Representation when the presence of coding dependency between the resolution components makes simultaneous retrieval in one request more efficient. The single Representation packaging of the other resolution components comes with the other benefit that the HR resolution can be signalled to the DASH client using the width and height attributes of this Representation, hence enabling the DASH client to select the appropriate Representations for the intended resolution rendering.

Figure 10:
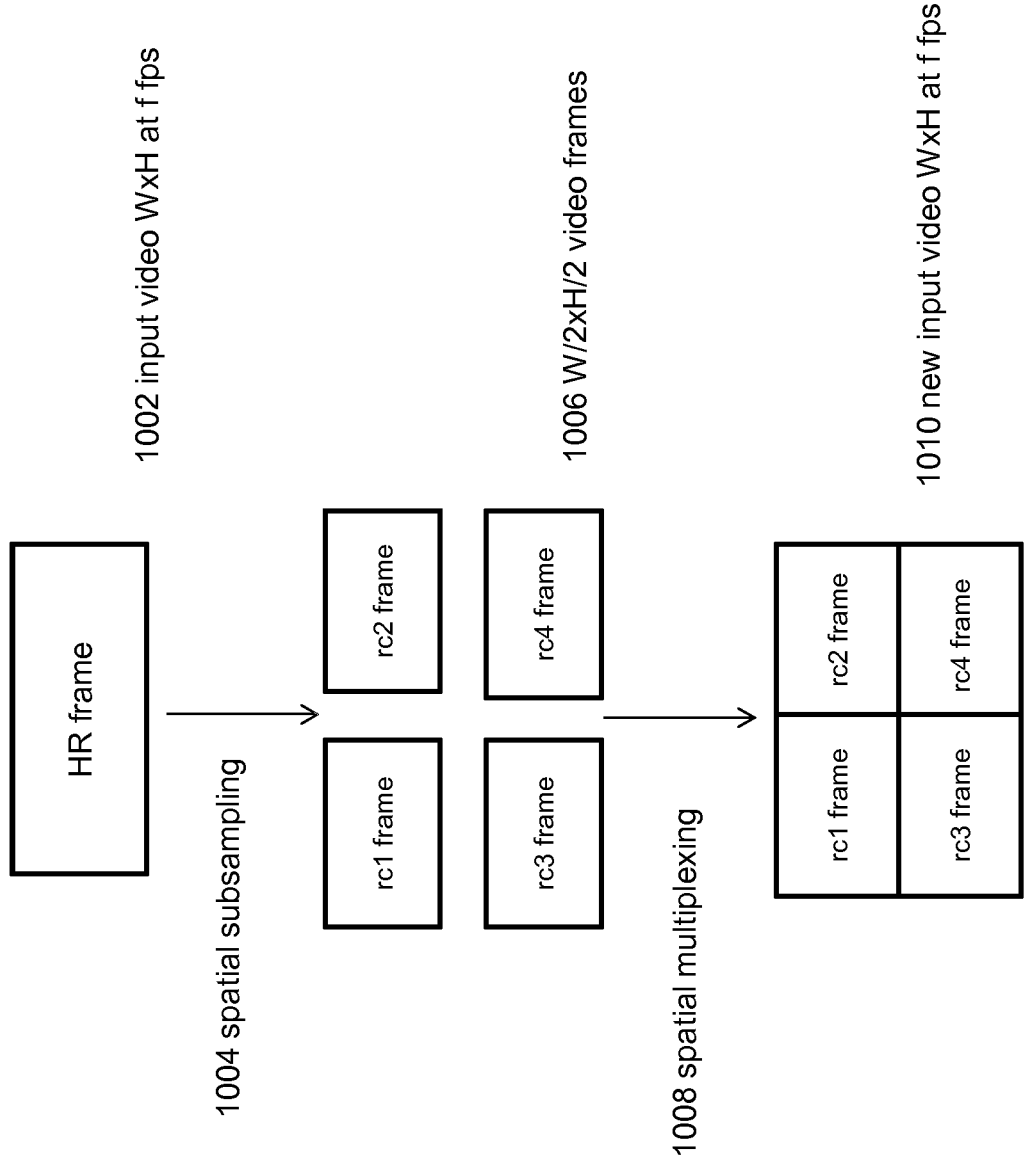
FIG. 10 depicts a process of forming an HEVC video signal comprising resolution components according to another embodiment of the invention.

In a further embodiment, the implementation of the resolution component scheme may use the HEVC tile feature of the HEVC/H.265 video coding standard. FIG. 10 depicts a process of forming an HEVC video signal comprising resolution components according to another embodiment of the invention. In this particular example video frames 1006 of, in this example, four resolution components may be created by subsampling 1004 high-resolution frames of an original video signal 1002. Tiled video frames of a new video signal that is input to an HEVC encoder that supports the tiling feature may be formed by spatial multiplexing (e.g. combining in one videoframe) 1008 video frames 1006 of the resolution components rc1-rc4, wherein the size of the video frames of the resolution components match the size of the tiles of the tiled video frames that are generated by the HEVC encoder. The new video signal has a frame rate that is equal to the frame rate of the original video and a spatial resolution also equal to the original video.

The new input video signal 1010 is fed to the HEVC video encoder wherein the video signal comprises information (metadata) indicative of the characteristics of the new input video (resolution, frame rate, etc.). Furthermore, the HEVC encoder is configured such that the HEVC output bitstream comprises HEVC tiles (rc1 frame, rc2 frame, rc3 frame, rc4 frame) coinciding with the video frames of the four LR resolution components.

In case of HEVC tiled video frames comprising HEVC tiles there is by definition no coding dependency within HEVC tiles of the same video frames since the encoder is configured so that intra-frame prediction does not cross tile boundaries. However, other kinds of spatial dependency such as in-loop filtering need also to be disabled. In addition, the encoder needs to be configured such that video frames of the first resolution component only depend on other video frames of the first resolution component for inter-prediction in order to constitute an independently-decodable low-resolution version of the bitstream comprising only video frames of the first resolution component. To that end, the HEVC encoder is configured such that:

in-loop filtering is disabled when rendering the final output frame;

motion vectors (inter-frame prediction) are constrained to the LR0 component tile of previous and next video frames.

In an embodiment, no motion vector constraint may be applied to the first resolution component rc1, second resolution component rc2 and third resolution component rc3 tiles in order to increase compression efficiency, hence introducing temporal coding dependency between them.

In another embodiment, the coding of the media data of resolution components rc1,rc2,rc3 may depend on the media data of the video tiles of the first resolution component, hence introducing temporal coding dependency on the tiles of the first resolution component only. Ultimately, what matters is that media data of the tiles of the first resolution component can be independently decoded.

The bitstream comprises decoder information in order to ensure a proper decoding and rendering of the resolution component. The decoder information may be signalled in the bitstream in a similar way as described with reference to FIGS. 7 and 8. That is, if a low-resolution version of the video is intended, only the top left tiles (representing the independently encoded media data of the first resolution component) need to be decoded and rendered. If the high resolution of the video is intended, the 4 resolution components must be decoded, i.e. the 4 tiles (the entire frame) must be decoded, and the output frames must be reorganised to produce the video frames of the high-resolution representation.

In the context of NAL units based video coding standard, namely MPEG-4 part 10 AVC/H.264 or HEVC/H.265 video coding standards, the decoder information may be transmitted in SEI messages to the decoder. In particular, in HEVC, the decoder information may be signaled to the decoder in a SEI message.

FIG. 11 depicts a SEI message for signaling decoder information according to an embodiment of the invention.

The HEVC standard defines type defines a type 5 as a frame packing arrangement comprising sequentially decoded frames having a temporal interleaving arrangement of alternating first and second frames.

Hence, in the same way, a new type (type 6) of the frame_packing_arrangement_type may be defined for signaling the decoder that each decoded frame contains a tiled arrangement of, in this example four, resolution components:

| Value | Interpretation |
|---|---|
| 3 | Each component plane of the decoded frames contains a side-by-side packing arrangement of corresponding planes of two constituent frames as illustrated in FIG. D-4, FIG. D-5, and FIG. D-8. |
| 4 | Each component plane of the decoded frames contains a top-bottom packing arrangement of corresponding planes of two constituent frames as illustrated in FIG. D-6 and FIG. D-7. |
| 5 | The component planes of the decoded frames in output order form a temporal interleaving of alternating first and second constituent frames as illustrated in FIG. D-9. |
| 6 | Each component plane of the decoded frames contains a 2-by-2 packing arrangement of 4 resolution components corresponding to the 4 constituent frames. |

In addition, a new type content_interpretation_type is defined in order to signal the decoder that for each specified frame packing arrangement scheme (except 6), there are two

| Value | Interpretation |
|---|---|
| 0 | Unspecified relationship between the frame packed constituent frames |
| 1 | Indicates that the two constituent frames form the left and right views of a stereo view scene, with frame 0 being associated with the left view and frame 1 being associated with the right view |
| 2 | Indicates that the two constituent frames form the right and left views of a stereo view scene, with frame 0 being associated with the right view and frame 1 being associated with the left view |
| 3 | Indicates that the 4 constituent frames form the four resolution components produced by a polyphase susbsampling of factor 2. These resolution components being arranged in a raster scan with frame 0 being associated with the first resolution component, frame 1 with the second, frame 2 with the third and frame 3 with the fourth. | constituent frames that are referred to as frame 0 and frame 1. For type 6, frame 2 and 3 exist.

Here, the raster scan order numbering is depicted in Table 3. In this embodiment, the current_frame_is_frame0_flag is not relevant since the four constituent frames are always present in every decoded frame. The flag could be set to 1 for consistency, the solution mandates by design that frames 0 to 3 are present in every frame, so there is no need to add further information.

Hence, the syntax of the frame packing arrangement SEI message may be modified to take into account the new frame packing arrangement type. FIG. 11 depicts a modified syntax of the frame packing arrangement SEI message according to an embodiment of the invention.

In order to enable the flexible delivery of such a bitstream, it is advantageous to enable the selection of one resolution component for the decoding and rendering of a low resolution version of a video signal. To this end, one solution is to store each resolution component contained in HEVC tile in a separate track of an ISOBMFF file as depicted in FIG. 15. Please note that such a HEVC tile track storage is known from MPEG standardisation activity although not published yet.

Figure 12:
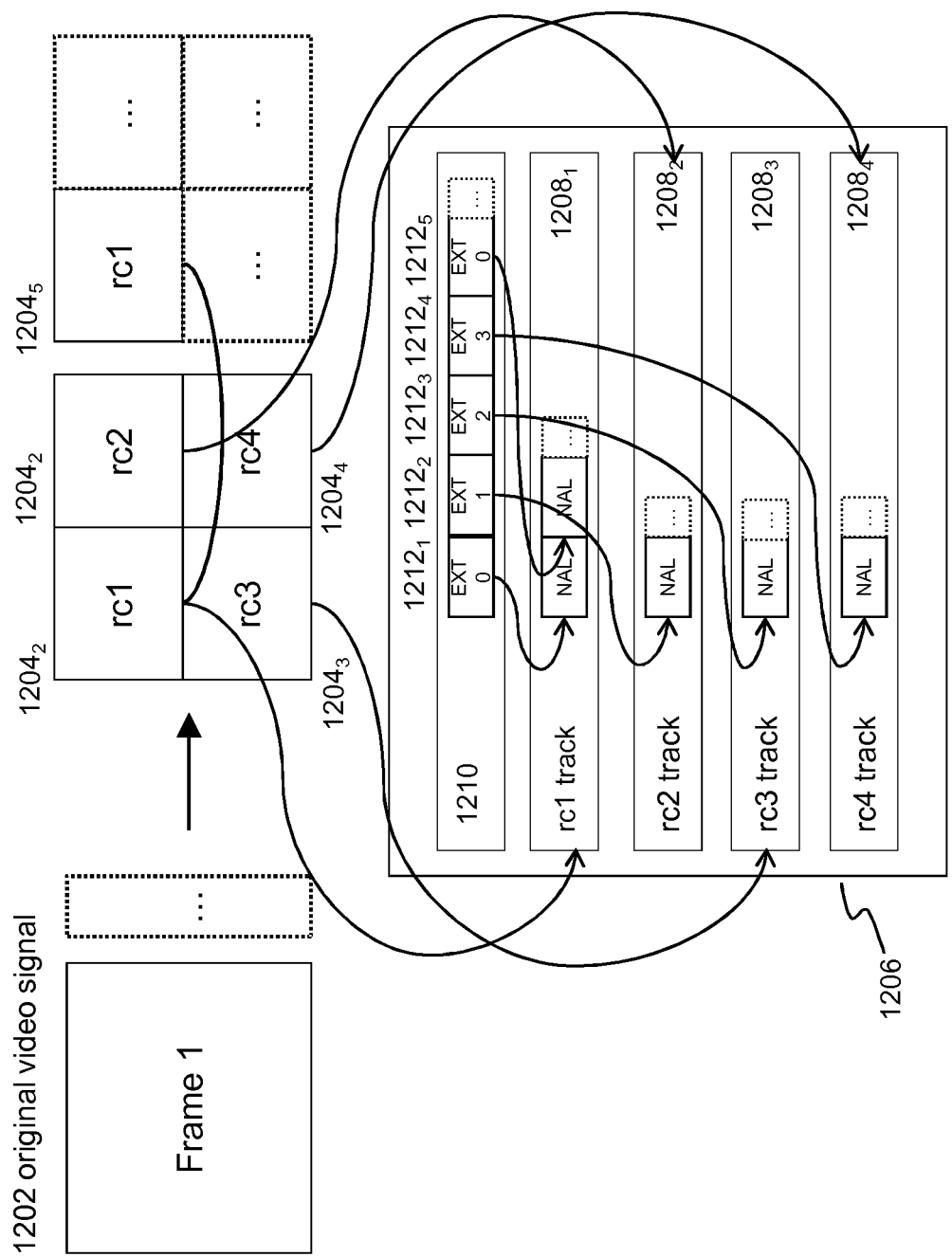
FIG. 12 schematically depicts a file format for storing resolution components according to an embodiment of the invention.

In order to enable the flexible delivery of such a bitstream, it is advantageous to enable the selection of one resolution component for the LR rendering. FIG. 12 schematically depicts the encoding of video frames 1202 of an original video signal into an encoded sequence of tiled video frames $1204_{1-5}$ wherein the size of the low resolution video frames match the size of the tiles of the tiled video frame and the low resolution components are stored in separate tracks $1208_{1-4}$ of a suitable transport container, e.g. an ISOBMFF file 1206.

In such a file, the base track 1210 may contain extractors $1212_{1-5}$ comprising pointers pointing to VCL NAL units of each of the resolution components, so that the original bitstream may be recreated. In an embodiment, in order to reduce the number of tracks, the LR0 track $1208_1$ may be incorporated in the base track, since the LR0 track contains the data to render the LR frames which are always needed, no matter the intended output resolution.

The base track may comprise non-VCL NAL units, including PPS, SPS and VPS NAL units. In a further embodiment, if some non VCL NAL units are specifically associated with with the VCL NAL units of a resolution component, it is advantageous to store them in their respective track. This way, it may be avoided to pollute the base track with data that are not needed to decode a particular track. The transport of such a bitstream is not limited to the ISOBMFF standard but can be readily implemented in a similar way in other containers such as MPEG-2 TS.

Assuming the ISOBMFF variant is used for transporting the bitstream, the state-of-the-art Media Presentation Description (MPD) of the ISO/IEC 23009-1 MPEG DASH standard may be used to describe the track structure in the ISOBMFF file in a manifest file such that a DASH client device may select a particular resolution component from the available resolution components for rendering. In an embodiment, the resolution component may be defined as a separate Representation element in the manifest file (one per track) in case each resolution components is independently decodable.

Alternatively, in another embodiment, the resolution components (or a part thereof) may be provided in a single Representation element when the presence of coding dependency between the resolution components makes simultaneous retrieval in one request more efficient. The single Representation definition of the other resolution components in the MPD provides the benefit that the format of the high-resolution video signal that can be rendered on the basis of the resolution components can be signalled to the DASH client using the width and height attributes of the Representation element, hence enabling the DASH client to select the appropriate Representations for the intended resolution rendering.

In an embodiment, the input and output of respectively video encoders and decoders are configured on the basis of the raw video format in which colour components are stored according to a certain format, e.g. YUV420. In the present disclosure, the decomposition of regular video signals into low-resolution resolution components takes place in the encoding phase and is reverted in the decoding phase.

Figures 13A, 13B:
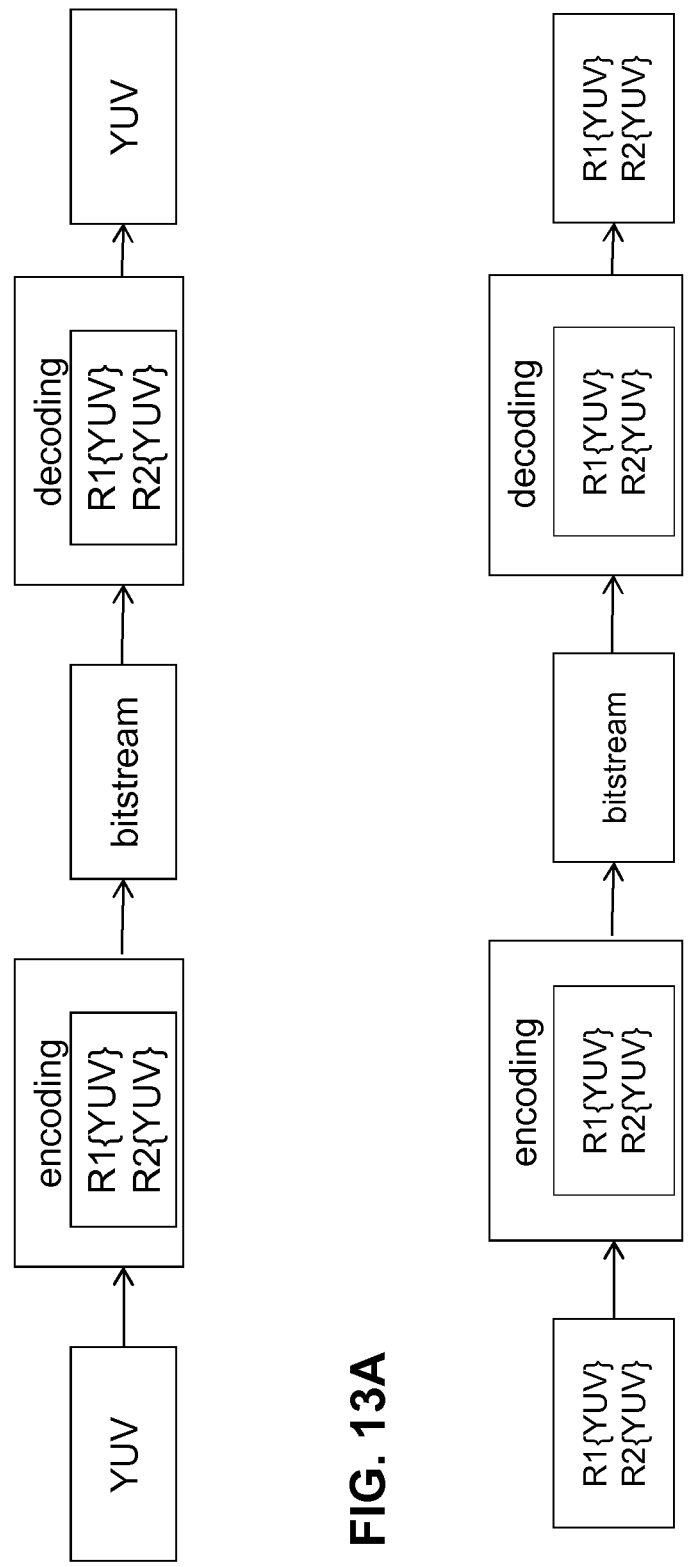
FIGS. 13A and 13B depicts a raw video format for use in a coding system according to an embodiment of the invention.

FIG. 13A depicts a coding system using the resolution component format as internal format in the bitstream according to an embodiment of the invention. Here, R1 and R2 represent two resolution components. In an embodiment, a raw video format (in an adequate SDO e.g. ISPO MPEG, ITU, or SMTPE) may be defined comprising resolution components in addition to colour planes. In such a format, the source (camera, editing software) would produce the original video signal in such a format avoiding the spatial subsampling operations to take place in the encoder. Based on the given format definition, the rendering device would perform the appropriate operations (upsampling and recomposition) to output the reconstructed video signal.

FIG. 13B depicts coding system using the resolution component format as internal format in the bitstream which is also the raw format of the raw video source according to an embodiment of the invention. This approach is much more fundamental and would require synergy with many SDOs active at the lower level of the video signal, e.g. ITU, SMTPE, etc., impacting the whole video chain industry, i.e. camera, contribution signal, studio editing, broadcasting, transport, consumption, possibly display devices. The main benefit of this approach is that the decomposition in resolution components would happen only once (production) and not every time an encoding is performed.

The embodiments in this disclosure are not limited to video coding and could also be applied to still picture coding. In this context, one of the main benefits would be progressively downloadable pictures. That is, the device retrieved and displays first the video frame of a resolution component while it downloads media data of the other resolution components. When all resolution component are available and decoded, the device displays the HR frame. Generation of thumbnail images would also be another type of applications when dealing with pictures. By simply filtering out three of the resolution components of the bitstream, the resulting bitstream would then contain the LR frame which is proper for rendering as it is, hence providing a thumbnail of the HR frame.

Figure 14:
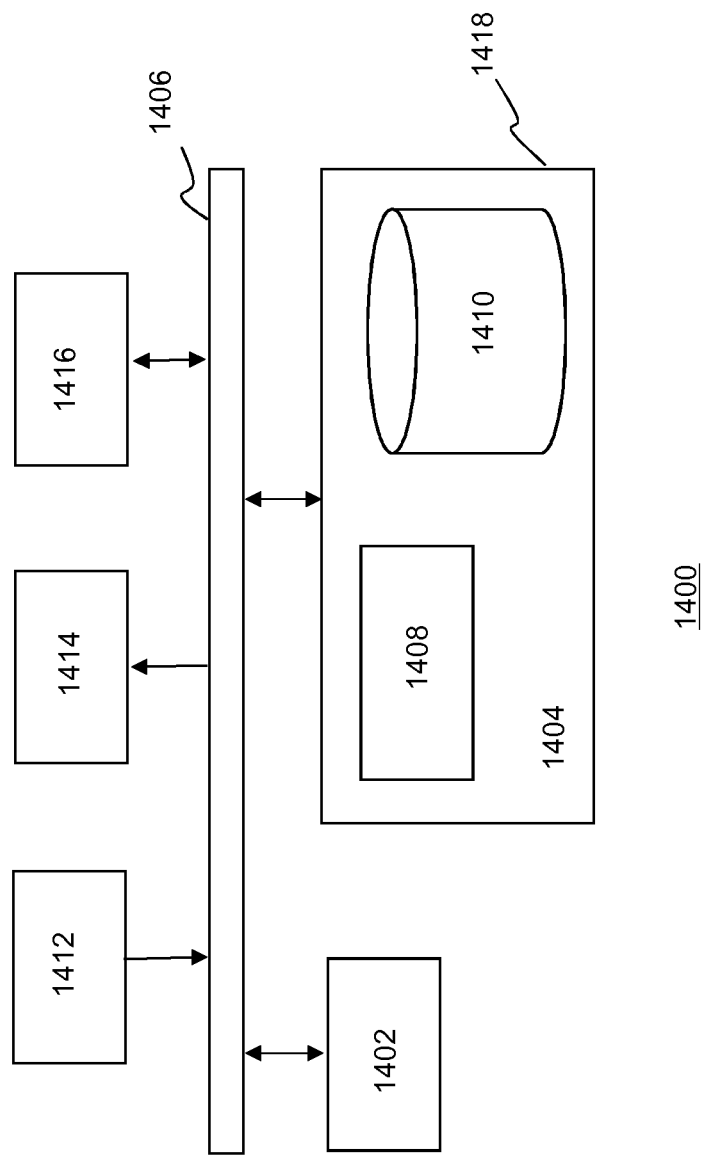
FIG. 14 depicts a block diagram illustrating an exemplary data processing system that may be used in as described in this disclosure.

FIG. 14 is a block diagram illustrating an exemplary data processing system that may be used in as described in this disclosure. Data processing system 1400 may include at least one processor 1402 coupled to memory elements 1404 through a system bus 1806. As such, the data processing system may store program code within memory elements 1404. Further, processor 1402 may execute the program code accessed from memory elements 1404 via system bus 1406. In one aspect, data processing system may be implemented as a computer that is suitable for storing and/or executing program code. It should be appreciated, however, that data processing system 1400 may be implemented in the form of any system including a processor and memory that is capable of performing the functions described within this specification.

Memory elements 1404 may include one or more physical memory devices such as, for example, local memory 1408 and one or more bulk storage devices 1410. Local memory may refer to random access memory or other non-persistent memory device(s) generally used during actual execution of the program code. A bulk storage device may be implemented as a hard drive or other persistent data storage device. The processing system 1400 may also include one or more cache memories (not shown) that provide temporary storage of at least some program code in order to reduce the number of times program code must be retrieved from bulk storage device 1410 during execution.

Input/output (I/O) devices depicted as input device 1412 and output device 1414 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1416 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1450.

As pictured in FIG. 14, memory elements 1404 may store an application 1418. It should be appreciated that data processing system 1400 may further execute an operating system (not shown) that can facilitate execution of the application. Application, being implemented in the form of executable program code, can be executed by data processing system 1400, e.g., by processor 1402. Responsive to executing application, data processing system may be configured to perform one or more operations to be described herein in further detail.

In one aspect, for example, data processing system 1400 may represent a client data processing system. In that case, application 1418 may represent a client application that, when executed, configures data processing system 1400 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1418, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of forming a video signal by a decoder device comprising:

receiving a bitstream and decoder information, the bitstream comprising the decoder information, the decoder information signaling the decoder device the presence of one or more resolution components in the bitstream for forming the video signal, each resolution component comprising encoded media data and representing a spatially subsampled version of a first video signal having a first resolution, the one or more resolution components being part of a resolution component group, the group comprising a plurality of resolution components on the basis of which the first video signal is reconstructable; and the decoder device parsing the bitstream and forming the video signal, wherein forming the video signal comprises:

decoding the one or more resolution components into video frames on the basis of the decoder information;

if the decoder information signals that the bitstream comprises only one first resolution component of the group, then:

decoding parsed parts of the bitstream representing the first resolution component into video frames representing a second video signal of a second resolution, the second resolution being lower than the first resolution, if the decoder information signals that the bitstream comprises the first resolution component and one or more further resolution components of the group, then:

decoding parsed parts of the bitstream representing the first resolution component and the one or more further resolution components into video frames;

if the decoder information signals that the bitstream comprises all resolution components of the group, then: reconstructing the first video signal into a reconstructed first video signal, on the basis of the video frames; and if the decoder information signals that the bitstream does not comprise all resolution components of the group, then: constructing on the basis of the video frames a third video signal having a third resolution, the third resolution being higher than the second resolution and lower than the first resolution.

2. The method according to claim 1, wherein at least two or more of the resolution components have the same resolution, and/or the one or more further resolution components have a decoding dependency on the first resolution component.

3. The method according to claim 1, wherein the encoded media data of the first resolution component are independently decodable and wherein encoded media data of the one or more further resolution components only have a coding dependency on the first resolution component.

4. The method according to claim 1, wherein the decoder information comprises particular information, the particular information being at least one of:
   at least one parameter indicative of the resolution of the first video signal, the second video signal or the third video signal,
   one or more resolution component identifiers identifying the one or more resolution components in the bitstream,
   information identifying the resolution component in the group of resolution components for forming the second signal and/or the resolution components in the group of resolution components for forming the third video signal,
   information on the resolution of each resolution component, or
   a parameter indicative of a super-resolution operation for forming the first or third video signal on the basis of the first and further resolution components; and, optionally, information needed for the indicated super-resolution operation.

5. The method according to claim 1, wherein the bitstream comprises NAL units, the decoder information and the one or more resolution components being included in one or more VCL NAL units.

6. The method according to claim 5, wherein the NAL units include a particular unit, the particular unit being at least one of:
   a non VCL NAL unit comprising a parameter indicative of a resolution component format,
   a non VCL NAL unit comprising one or more parameters indicative of the resolution of video frames of the first video signal,
   a non VCL NAL unit comprising a parameter indicative of a spatial subsampling technique used for generating the one or more resolution components or a flag indicating that the one or more resolution components are determined on the basis of a polyphase subsampling technique, or
   a VCL NAL unit comprising a header comprising a resolution component identifier for identifying a resolution component.

7. The method according to claim 1, wherein the one or more resolution components in the group of resolution components are polyphase subsampled versions of the first video signal, and wherein forming the reconstructed first video signal further comprises:
   upsampling a video frame to a resolution format of video frames of the first video signal;
   zero-padding the upsampled video frame;
   shifting the upsampled zero-padded video frame in accordance to its positions in a video frame of the first video signal; and
   adding the upsampled zero-padded video frame to a video frame of the first video signal.

8. The method according to claim 1, wherein the bitstream is a HEVC bitstream, the bitstream comprising decoder information for signalling an HEVC decoder that video frames of the resolution components are temporally multiplexed into a temporal multiplexed order of video frames, the video frames of the resolution components being arranged in an interleaved order.

9. The method according to claim 1, wherein the bitstream is a HEVC bitstream, the decoder information signalling an HEVC decoder that the decoded video frames comprise a tiled arrangement of resolution components.

10. The method according to claim 8, wherein the temporal multiplexed order of the video frames of the resolution components or the tiled arrangement of the resolution component schemes are signalled in one or more NAL units to the HEVC decoder, the one or more NAL units being one or more SEI messages.

11. The method according to claim 1, wherein forming the reconstructed first signal further comprises:
   using a super-resolution video image reconstruction technique for generating video frames of the first video signal.

12. The method according to claim 6, wherein the parameter indicative of a resolution component format is resolution_component_format_idc,
   and wherein each of the one or more parameters indicative of the resolution of video frames of the first video signal is one of pic_width_in_luma_samples or pic_height_in_luma_samples.

13. The method according to claim 1, wherein the one or more resolution components in the group of resolution components are polyphase subsampled versions of the first video signal, and wherein forming the third video signal further comprises:
   upsampling a video frame to a resolution format of video frames of the third video signal;
   zero-padding the upsampled video frame;
   shifting the upsampled zero-padded video frame in accordance to its positions in a video frame of the third video signal; and
   adding the upsampled zero-padded video frame to a video frame of the third video signal.

14. The method according to claim 9, wherein the temporal multiplexed order of the video frames of the resolution components or the tiled arrangement of the resolution component schemes are signalled in one or more NAL units to the HEVC decoder, the one or more NAL units being one or more SEI messages.

15. The method according to claim 1, wherein forming the third signal further comprises:
   using a super-resolution video image reconstruction technique for generating video frames of the third or third video signal.

16. A method of forming a bitstream by an encoder device comprising:
   forming a group of resolution components by spatial subsampling video frames of a first video signal of a first resolution, wherein on the basis of video frames of the group of resolution components the first video signal is reconstructable;
   selecting one or more resolution components from the group of resolution components; and
   the encoder device forming the bitstream and decoder information on the basis of the one or more selected resolution components, wherein forming the bitstream and decoder information on the basis of the one or more selected resolution components comprises:
   if only a single resolution component is selected, then:
      the encoder device encoding a first resolution component of the group of resolution components, the first resolution component having a second resolution; and generating decoder information for a decoder to decode the single resolution component into a second video signal having the second resolution, the second resolution being lower than the first resolution; and if a first resolution component and one or more further resolution components are selected, then:
the encoder device encoding the first resolution component and the one or more further resolution components of the group of resolution components into a first bitstream part and one or more further bitstreams parts respectively;
combining the first bitstream part and the one or more further bitstreams parts;

if the decoder information signals to the decoder device that the bitstream comprises all resolution components of the group, then:
generating decoder information for the decoder to decode the first resolution component and the one or more further resolution components into video frames for reconstructing the first video signal, the encoder device inserting the decoder information into the bitstream; and if the decoder information signals to the decoder device that the bitstream does not comprise all resolution components of the group, the:
generating decoder information for the decoder to decode the first resolution component and the one or more further resolution components into video frames for constructing a third video signal having a third resolution, the third resolution being higher than the second resolution and lower than the first resolution, the encoder device inserting the decoder information into the bitstream.

17. The method according to claim 16,
wherein encoding one or more further resolution components of the group of resolution components comprises:
determining first video frames on the basis of the first bitstream part;
determining one or more further residual video frames on the basis of the first video frames and video frames of the one or more further resolution components; and
encoding the one or more further residual video frames into the one or more further bitstreams parts,
wherein, if the decoder information signals the first resolution component and one or more further resolution components, the decoder information signalling the decoder device that the video frames of the first video signal and the third video signal are formed on the basis of the video frames of the first resolution component and the one or more further residual video frames of the one or more further resolution components.

18. The method according to claim 16, further comprising:
storing the first bitstream part and the one or more further bitstream parts and at least part of the decoder information in separate resolution component tracks.

19. The method of claim 18, further comprising:
providing a base track associated with at least part of the resolution component tracks, the base track comprising a sequence of extractors, each extractor pointing to an entry in one of the resolution component tracks.

20. A decoding device comprising:
one or more processors; and
memory storing computer-readable instructions that, when executed by the one or more processors, cause the decoding device to carry out operations including:

receiving a bitstream and decoder information, the bitstream comprising the decoder information, the decoder information signaling the decoder device the presence of one or more resolution components in the bitstream for forming a video signal, each resolution component representing a spatially subsampled version of a first video signal having a first resolution, the one or more resolution components being part of a resolution component group, the group comprising a plurality of resolution components on the basis of which the first video signal is reconstructable and wherein at least two or more resolution components have the same resolution; and parsing the bitstream and forming the video signal, wherein forming the video signal comprises:

decoding at least one of the one or more resolution components into video frames on the basis of the decoder information, if the decoder information signals that the bitstream comprises only a first resolution component of the group, then:
decoding parsed parts of the bitstream representing the first resolution component into video frames representing a second video signal of a second resolution, the second resolution being lower than the first resolution;

if the decoder information signals that the bitstream comprises the first resolution component and one or more further resolution components of the group, then:
decoding parsed parts of the bitstream representing the first resolution component and one or more further resolution components into video frames;

if the decoder information signals that the bitstream comprises all resolution components of the group, then: reconstructing the first video signal into a reconstructed first video signal on the basis of the video frames; and if the decoder information signals that the bitstream does not all resolution components of the group, then: constructing a third video signal having a third resolution on the basis of the video frames, the third resolution being higher than the second resolution and lower than the first resolution.

21. An encoding device comprising:
one or more processors; and
memory storing computer-readable instructions that, when executed by the one or more processors, cause the encoding device to carry out operations including:

forming a group of resolution components by spatial subsampling video frames of a first video signal having a first resolution, wherein on the basis of the video frames of the group of resolution components the first video signal is reconstructable and wherein at least two or more resolution components have the same resolution;

selecting one or more resolution components from the group of resolution components; and forming a bitstream and decoder information on the basis of the one or more selected resolution components;
wherein forming the bitstream and decoder information on the basis of the one or more selected resolution components comprises:

if only a single resolution component is selected, then:
encoding a first resolution component of the group of resolution components, the first resolution component having a second resolution; and generating information for a decoder to decode the single resolution component into a second video signal of the second resolution, the second resolution being lower than the first resolution; and if a first resolution component and one or more further resolution components are selected, then:

encoding the first resolution component and the one or more further resolution components of the group of resolution components into a first bitstream part and one or more further bitstreams parts respectively;

combining the first bitstream part and the one or more further bitstreams parts;

if the decoder information signals to the decoder device that the bitstream comprises all resolution components of the group, then:

generating information for the decoder to decode the first resolution component and the one or more further resolution components into video frames for reconstructing the first video signal, and inserting the decoder information into the bitstream; and if the decoder information signals to the decoder device that the bitstream does not comprise all resolution components of the group, then:

generating information for the decoder to decode the first resolution component and the one or more further resolution components into video frames for constructing a third video signal having a third resolution, the third resolution being higher than the second resolution and lower than the first resolution, and inserting the decoder information into the bitstream.

22. A non-transitory computer-readable medium having instructions stored thereon that, when executed by one or more processors of a decoder device, cause the decoder device to carry out operations including:

receiving a bitstream and decoder information, the bitstream comprising the decoder information, the decoder information signaling the decoder device the presence of one or more resolution components in the bitstream for forming the video signal, each resolution component comprising encoded media data and representing a spatially subsampled version of a first video signal having a first resolution, the one or more resolution components being part of a resolution component group, the group comprising a plurality of resolution components on the basis of which the first video signal is reconstructable; and parsing the bitstream and forming the video signal, wherein forming the video signal comprises:

decoding the one or more resolution components into video frames on the basis of the decoder information;

if the decoder information signals that the bitstream comprises only one first resolution component of the group, then:

decoding parsed parts of the bitstream representing the first resolution component into video frames representing a second video signal of a second resolution, the second resolution being lower than the first resolution, if the decoder information signals that the bitstream comprises the first resolution component and one or more further resolution components of the group, then:

decoding parsed parts of the bitstream representing the first resolution component and the one or more further resolution components into video frames; and, if the decoder information signals that the bitstream comprises all resolution components of the group, then: reconstructing the first video signal into a reconstructed first video signal on the basis of the video frames; and if the decoder information signals that the bitstream does not comprise all resolution components of the group, then: constructing on the basis of the video frames a third video signal having a third resolution, the third resolution being higher than the second resolution and lower than the first resolution.

23. A non-transitory computer-readable medium having instructions stored thereon that, when executed by one or more processors of an encoder device, cause the encoder device to carry out operations including:

forming a group of resolution components by spatial subsampling video frames of a first video signal of a first resolution, wherein on the basis of video frames of the group of resolution components the first video signal is reconstructable;

selecting one or more resolution components from the group of resolution components; and forming a bitstream and decoder information on the basis of the one or more selected resolution components, wherein forming the bitstream and decoder information on the basis of the one or more selected resolution components comprises:

if only a single resolution component is selected, then:

encoding a first resolution component of the group of resolution components, the first resolution component having a second resolution; and generating decoder information for a decoder to decode the single resolution component into a second video signal having the second resolution, the second resolution being lower than the first resolution; and if a first resolution component and one or more further resolution components are selected, then:

encoding the first resolution component and the one or more further resolution components of the group of resolution components into a first bitstream part and one or more further bitstreams parts respectively;

combining the first bitstream part and the one or more further bitstreams parts;

if the decoder information signals to the decoder device that the bitstream comprises all resolution components of the group, then:

generating decoder information for the decoder to decode the first resolution component and the one or more further resolution components into video frames for reconstructing the first video signal, the encoder device inserting the decoder information into the bitstream; and if the decoder information signals to the decoder device that the bitstream does not comprise all resolution components of the group, the:

generating decoder information for the decoder to decode the first resolution component and the one or more further resolution components into video frames for constructing a third video signal having a third resolution, the third resolution being higher than the second resolution and lower than the first resolution, the encoder device inserting the decoder information into the bitstream.

* * * * *